(12) United States Patent
Urushi et al.

(10) Patent No.: US 6,254,123 B1
(45) Date of Patent: Jul. 3, 2001

(54) MOUNTING STRUCTURE FOR USE WITH A HEAD-PROTECTING AIRBAG BODY

(75) Inventors: Norio Urushi; Yoshiharu Furukawa; Hiroshi Ishiyama; Minoru Chida; Etsuji Saito; Kenichi Nakajima, all of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/363,390

(22) Filed: Jul. 29, 1999

(30) Foreign Application Priority Data

| Aug. 3, 1998 | (JP) | 10-219063 |
| Oct. 1, 1998 | (JP) | 10-280023 |
| Nov. 17, 1998 | (JP) | 10-327243 |

(51) Int. Cl.$^7$ ................................................. B60R 21/22
(52) U.S. Cl. ........................................ 280/730.2; 280/749
(58) Field of Search ............................ 280/728.2, 730.2, 280/730.1, 749

(56) References Cited

U.S. PATENT DOCUMENTS

| 5,265,903 | 11/1993 | Kuretake et al. . | |
| 5,788,270 | 8/1998 | Haland et al. . | |
| 5,791,683 | 8/1998 | Shibata et al. . | |
| 5,921,575 | * 7/1999 | Kretschmer et al. | 280/728.2 |
| 5,975,566 | * 11/1999 | Bocker et al. | 280/730.2 |
| 6,079,735 | * 6/2000 | Fallmann et al. | 280/730.2 |
| 6,082,761 | * 7/2000 | Kato et al. | 280/730.2 |

FOREIGN PATENT DOCUMENTS

| 957 010 | * 11/1999 | (EP) . |
| 9-249089 | 9/1997 | (JP) . |
| 10-138858 | 5/1998 | (JP) . |
| 11091490 | 4/1999 | (JP) . |

* cited by examiner

*Primary Examiner*—Paul N. Dickson
(74) *Attorney, Agent, or Firm*—Pillsbury Winthrop LLP

(57) ABSTRACT

A structure for mounting a head-protecting airbag body which inflates in the form of a curtain at least along a roof side rail across a B pillar is provided with an airbag body expansion direction restricting member which is disposed on the roof side rail in the vicinity of a upper end portion of a B pillar garnish covering the B pillar and has a guide wall extending toward the upper end portion of the B pillar garnish, and moving restricting portions which are disposed on the upper end portion of the B pillar garnish and the airbag body expansion direction restricting member and engage each other when a side collision occurs so as to restrict movement of the upper end portion of the B pillar garnish. When a vehicle body is deformed upon a slide collision, the upper end portion of the B pillar garnish attempts to move in a vehicle occupant compartment inner direction. However, when the movement restricting means disposed on the upper end portion of the B pillar garnish and airbag body expansion direction restricting means engage each other, the movement of the upper end portion of the B pillar garnish in a vehicle occupant compartment inner direction is restricted, so that the airbag body during inflation is never caught by the upper end portion of the B pillar garnish.

28 Claims, 34 Drawing Sheets

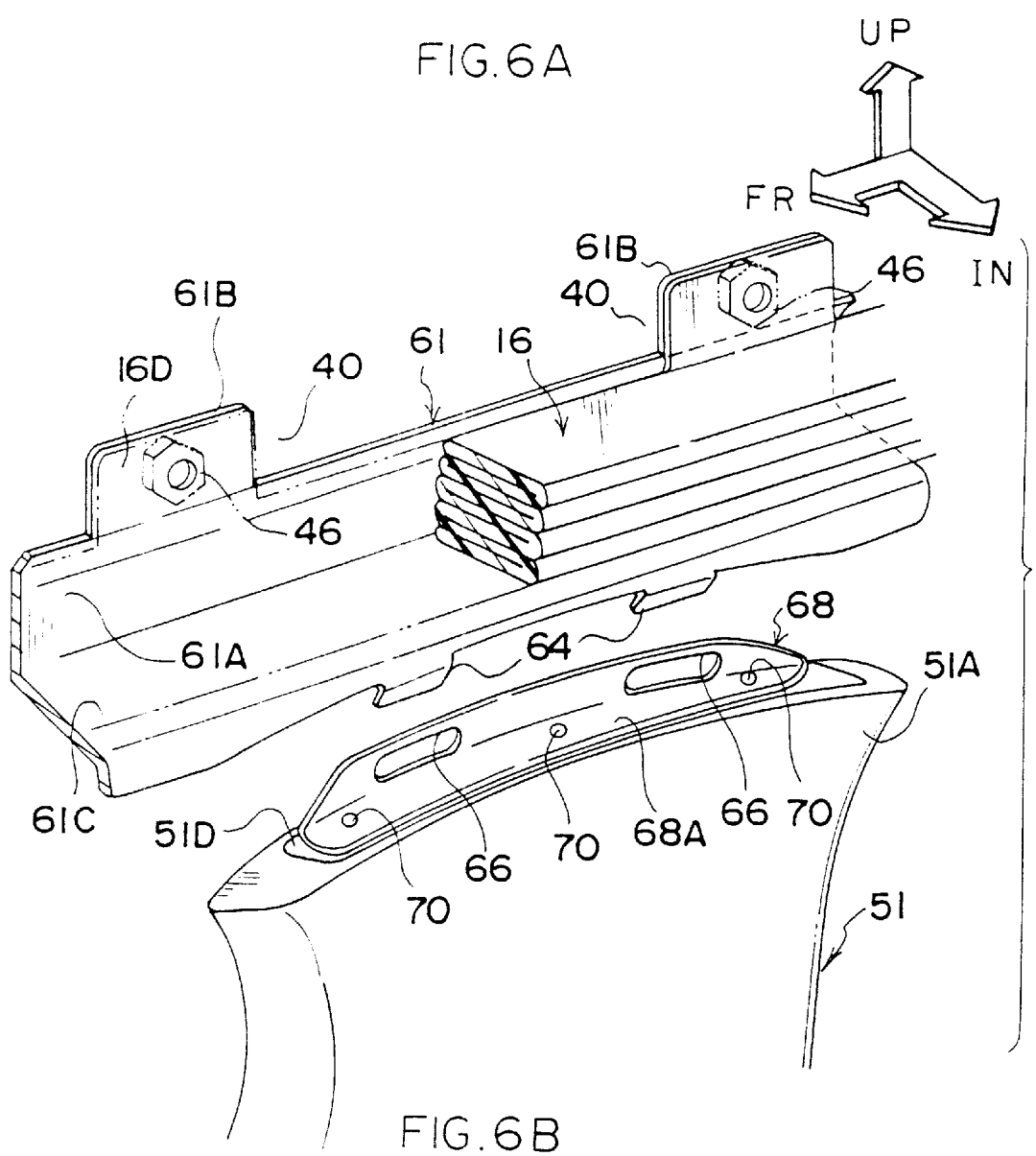
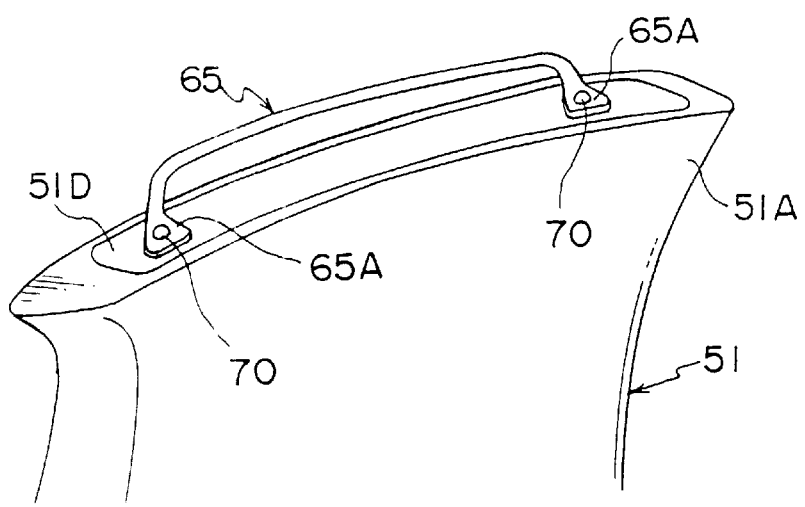

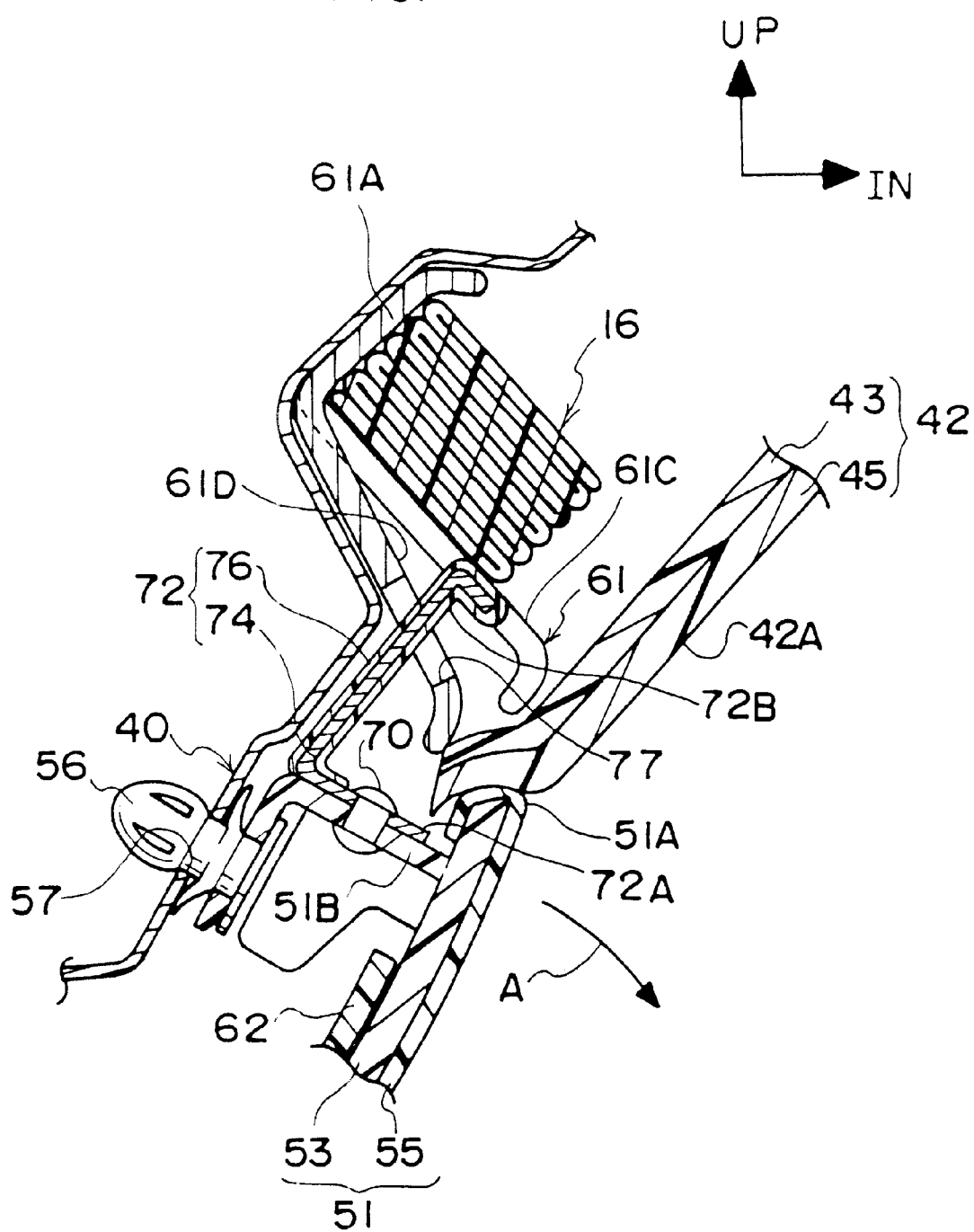

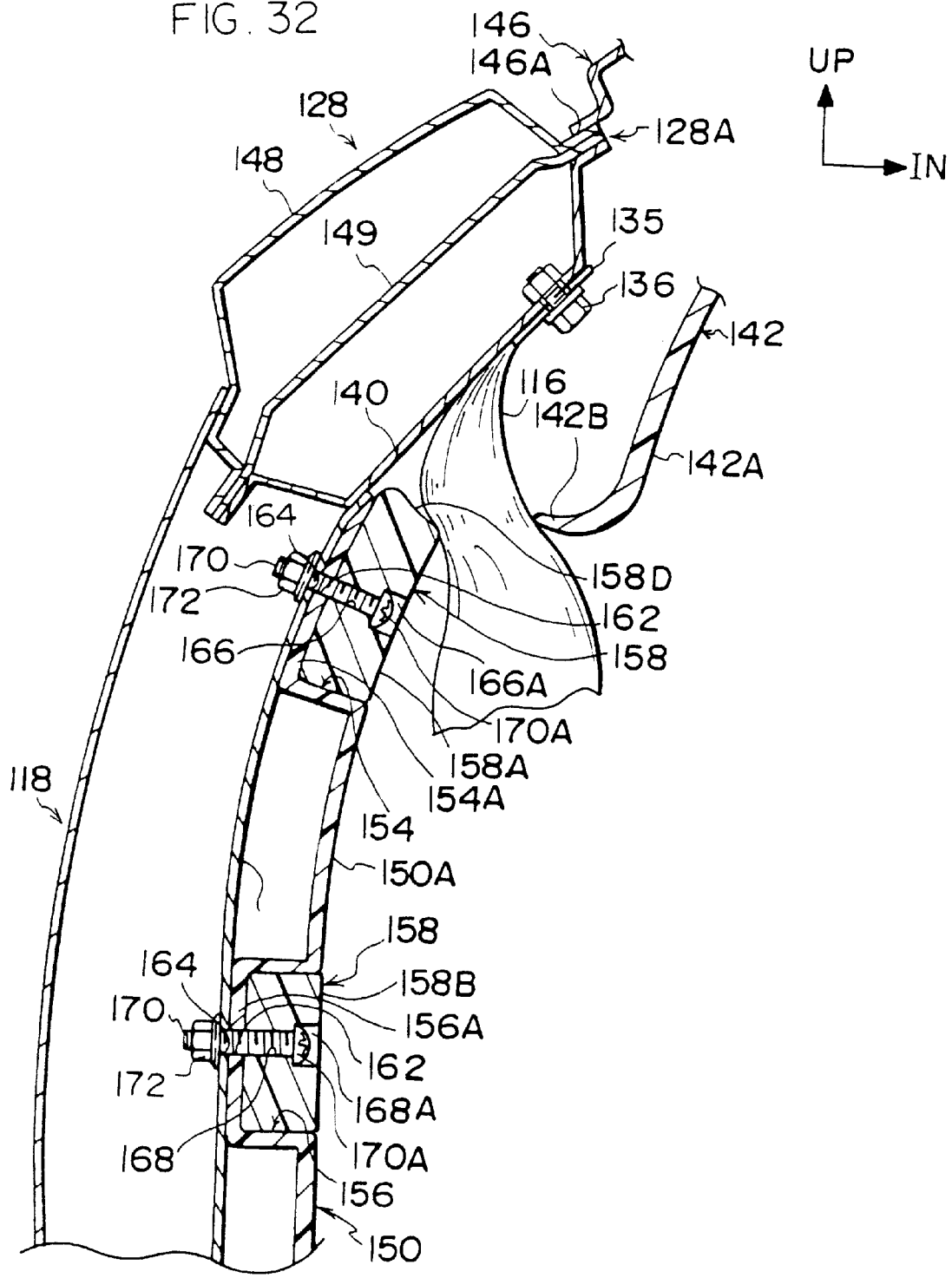

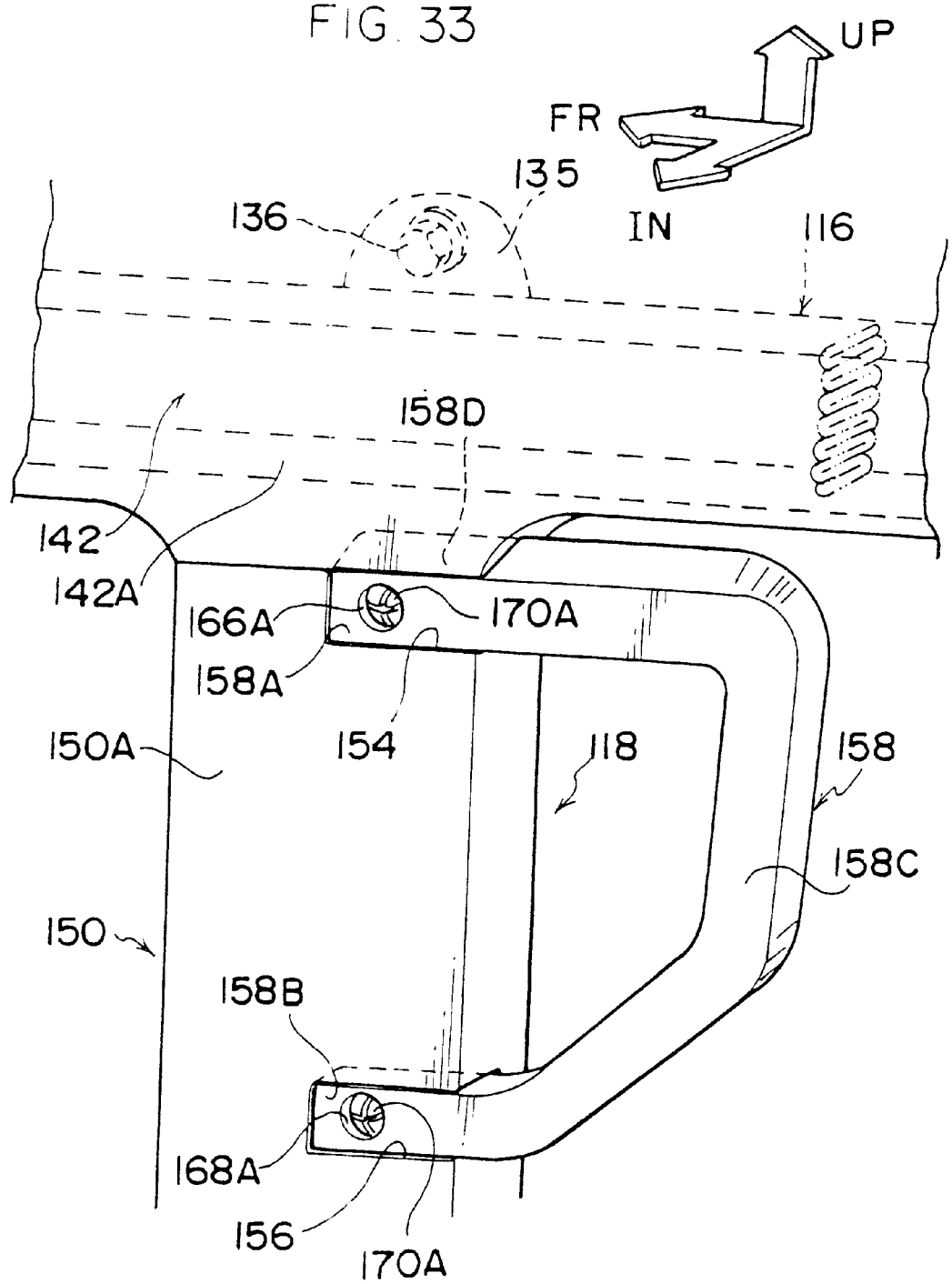

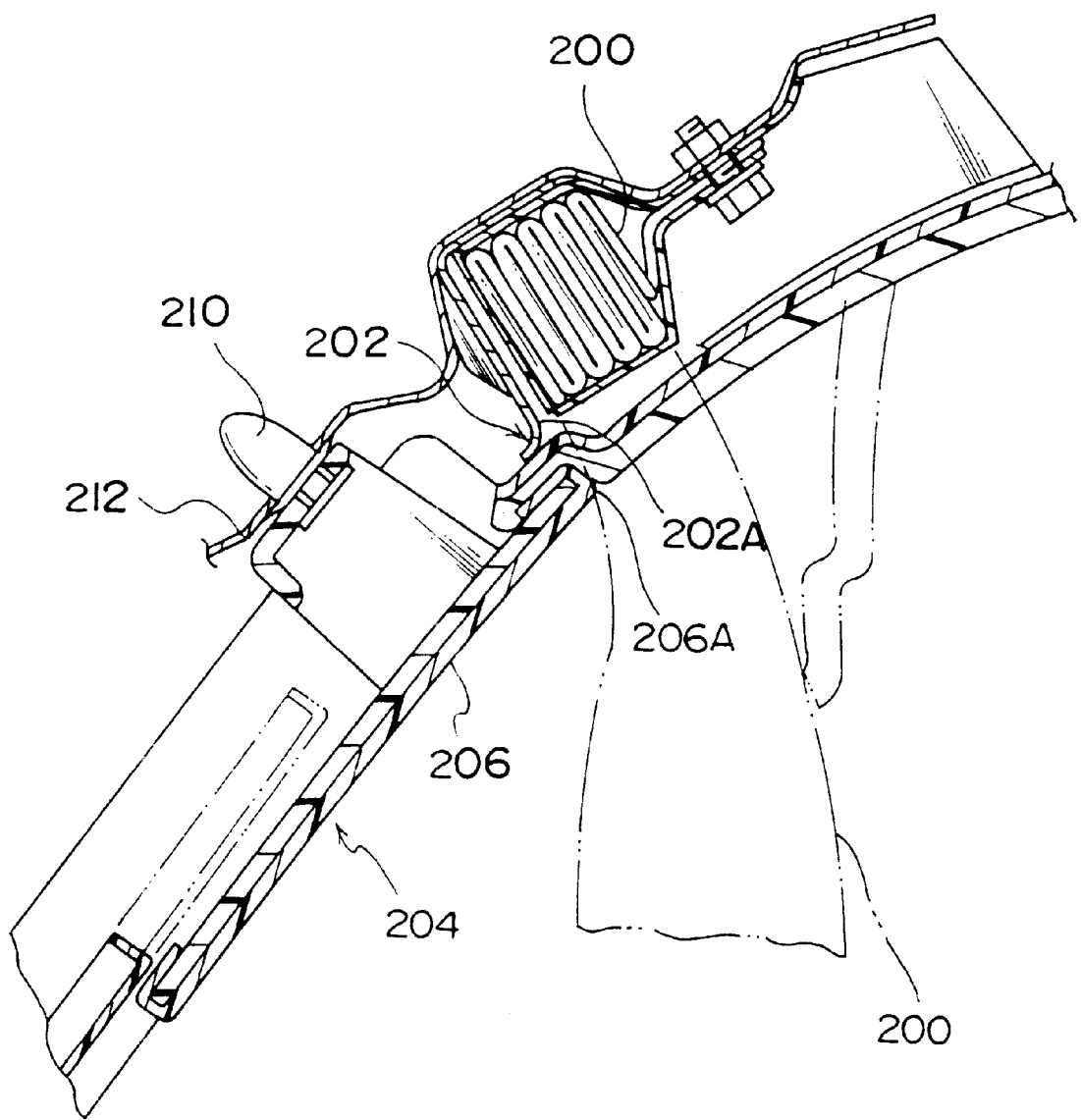

MOUNTING STRUCTURE FOR USE WITH A HEAD-PROTECTING AIRBAG BODY

BACKGROUND OF THE INVENTION

1. Field of the Invention

The present invention relates to a structure for a head-protecting airbag body in which by ejecting gas from an inflator when a predetermined high load is applied to a side portion of a vehicle, at least an airbag body accommodated along a roof side rail portion inflates in a curtain shape.

2. Description of the Related Art

The present applicant has already proposed a head-protecting airbag apparatus which is so constructed as to inflate an airbag body, accommodated in a folded state extending from an pillar portion to a roof side rail portion, in the form of a curtain along a side window glass, in order to improve the ability to protect the head of a vehicle occupant sitting on a front seat when a predetermined high load is applied to a vehicle side portion. Hereinafter, a structure disclosed in Japanese Patent Application Laid-Open (JP-A) No.11-91490 (published Apr. 6, 1999) which has proposed this head-protecting airbag apparatus will be described.

In this head-protecting airbag apparatus, as shown in FIG. 34, a jump base 202 is disposed below a folded airbag body 200 and the jump base 202 is disposed extending from a position in front of the B pillar 204 (called center pillar also) across the B pillar 204. The jump base 202 is composed of a sheet material bent so as to have an L-shaped cross-section and has a guide wall 202A extending toward a upper end portion 206A of the B pillar garnish 206. Therefore, when the airbag body inflates, as shown by the double dot dash line in FIG. 34, the airbag body 200 expands into the interior of the vehicle occupant compartment along a guide wall 202A of the jump base 202, so that the airbag body 200 does not become caught up by the upper end portion 206A of the B pillar garnish 206. Note that, ordinarily, the B pillar garnish 206 is divided into two sections, upper and lower, and the upper B pillar garnish is fastened to a vehicle body 212 at two upper and lower points.

However, although in this head-protecting airbag apparatus, the lower end portion of the B pillar garnish 206 is firmly fastened to the vehicle body, a upper end portion 206A is fixed to the vehicle body via a clip in order to increase of installing the head-protecting airbag apparatus. As a result, it can be considered that if the vehicle body is deformed by a side collision, the clip 210 may become dissociated from the vehicle body 212 so that the airbag body during inflation may be caught up by the upper end portion 206A of the loose B pillar garnish 206 as it inflates.

SUMMARY OF THE INVENTION

Accordingly, the present invention has been achieved in view of the above problem and therefore, an object of the invention is to provide a structure for mounting a head-protecting airbag body in which the airbag body during the process of inflating is never caught up by the upper end portion of the B pillar garnish so that expansion of the airbag body can be ensured.

To achieve the above object, according to a first aspect of the invention, there is provided a structure for mounting a head-protecting airbag body which inflates into a curtain shape at least along a roof side rail across a B pillar, wherein the structure for mounting a head-protecting airbag body is provided with catching preventing means for, even when the position of a upper end portion of a B pillar garnish covering the B pillar changes during a side collision of a vehicle, preventing the airbag body from being caught on the upper end portion of the B pillar garnish corresponding to the position change of the upper end portion.

Therefore, according to this aspect, when the position of the upper end portion of the B pillar garnish changes when a side collision occurs, the catching preventing means is actuated corresponding to that changed position. Thus, even if the upper end portion of the B pillar garnish leaves from an inner panel in a vehicle transverse inner direction upon that a side collision, the airbag body during inflation is prevented from being caught by the upper end portion.

According to a second aspect of the invention, there is provided a structure for mounting a head-protecting airbag body according to the first aspect, wherein the catching preventing means comprises airbag body expansion direction restricting means disposed on the roof side rail in the vicinity of the upper end portion of the B pillar garnish and having a guide wall extending toward the upper end portion of the B pillar garnish; and movement restricting means disposed on the upper end portion of the B pillar garnish and the airbag body expansion direction restricting means and by engaging each other upon a side collision, restricting movement of the upper end portion of the B pillar garnish in the vehicle occupant compartment transverse inner direction.

Accordingly, although, when the vehicle body is deformed upon a side collision, the upper end portion of the B pillar garnish attempts to move in a vehicle occupant compartment inner direction, the movement restricting means disposed on the upper end portion of the B pillar garnish and the airbag body expansion direction restricting means engage each other, thereby restricting movement of the upper end portion of the B pillar garnish in a vehicle occupant compartment inner direction. Therefore, the airbag body during inflation is never caught by the upper end portion of the B pillar garnish, so that the airbag can be expanded securely between a predetermined vehicle side portion and an occupant side portion.

According to a third aspect of the invention, there is provided a structure for mounting a head-protecting airbag body according to the second aspect, wherein the movement restricting means comprises an engaging protrusion formed so as to protrude on one of the upper end portion of the B pillar garnish and the airbag body expansion direction restricting means and an engaging hole formed on the other thereof.

Therefore, in addition to the contents of the second aspect, when the vehicle body is deformed upon a side collision so that the upper end portion of the B pillar garnish moves in a vehicle occupant compartment inner direction, the engaging protrusion formed so as to protrude on the one of the upper end portion of the B pillar garnish and the airbag body expansion direction restricting means engages the engaging hole formed on the other, thereby restricting movement of the upper end portion of the B pillar garnish in a vehicle occupant compartment inner direction. Further, this is achieved by a simple structure comprising only the engaging protrusion and engaging hole.

According to a fourth aspect of the invention, there is provided a structure for mounting a head-protecting airbag body according to the first aspect, wherein the catching preventing means further comprises an airbag body link means for moving the airbag body in a vehicle occupant compartment inner direction in linkage with a movement of the upper end portion of the B pillar garnish in a vehicle occupant compartment inner direction upon a side collision.

Therefore, when the vehicle body is deformed upon a side collision so that the upper end portion of the B pillar garnish moves in a vehicle occupant compartment inner direction, the airbag body is moved in a vehicle occupant compartment inner direction by the airbag body link means. As a result, even when the vehicle body is deformed upon a side collision so that the upper end portion of the B pillar garnish moves in a vehicle occupant compartment inner direction, a positional relation between the airbag body and the upper end portion of the B pillar garnish does not change largely. Therefore, the airbag body during inflation is never caught by the upper end portion of the B pillar garnish, so that the airbag body can be expanded securely between a specified vehicle side portion and an occupant side portion.

According to a fifth aspect of the invention, there is provided a structure for mounting a head-protecting airbag body according to the fourth aspect, wherein the airbag body link means is a plate disposed at the upper end portion of the B pillar garnish and comprising a guide wall for guiding the airbag body in a vehicle occupant compartment inner direction and an extending portion for scrawling over the airbag body from a vehicle occupant compartment outer side.

Therefore, in addition to the contents of the fourth embodiment, the guide wall of the plate serves as the airbag body expansion direction restricting means for restricting the expansion direction of the airbag body in a vehicle occupant compartment inner direction. With a simple structure in which only a plate is added to the upper end portion of the B pillar garnish, the airbag body can be expanded further securely in a vehicle occupant compartment inner direction with respect to the B pillar garnish.

According to a sixth aspect of the invention, there is provided a structure for mounting a head-protecting airbag body according to the first aspect, wherein the catching preventing means comprises airbag body expansion direction restricting means disposed on the roof side rail in the vicinity of the upper end portion of the B pillar garnish and having a guide wall extending toward the upper end portion of the B pillar garnish and a guide wall link means for moving the guide wall of the airbag body expansion direction restricting means in a vehicle occupant compartment inner direction in linkage with movement of the upper end portion of the B pillar garnish upon a side collision.

Therefore, when the vehicle body is deformed upon a side collision so that the upper end portion of the B pillar garnish moves in a vehicle occupant compartment inner direction, the guide wall is moved in a vehicle occupant compartment inner direction by the guide wall link means. As a result, even when the vehicle body is deformed upon the side collision so that the upper end portion of the B pillar garnish moves in a vehicle occupant compartment inner direction, a positional relation between the guide wall of the airbag body expansion direction restricting means and the upper end portion of the B pillar garnish does not change largely. Therefore, the airbag body during inflation is never caught by the upper end portion of the B pillar garnish, so that the airbag body can be expanded securely between a predetermined vehicle side portion and an occupant side portion.

According to a seventh aspect of the invention, there is provided a structure for mounting a head-protecting airbag body according to the sixth aspect, wherein the airbag body expansion direction restricting means is mounted to the roof side rail so as to be deformable in a vehicle occupant compartment inner direction.

Therefore, in addition to the contents of the sixth aspect, a mounting portion for mounting the airbag body expansion direction restricting means to the roof side rail is made deformable in a vehicle occupant compartment inner direction by such a simple structure.

According to an eighth aspect of the invention, there is provided a structure for mounting a head-protecting airbag body according to the sixth aspect, wherein the guide wall of the airbag body expansion direction restricting means is deformable in a vehicle occupant compartment inner direction.

Therefore, in addition to the content of the sixth aspect, the guide wall of the airbag body expansion direction restricting means is made deformable in a vehicle occupant compartment inner direction by such a simple structure.

According to the ninth aspect of the invention, there is provided a structure for mounting a head-protecting airbag body according to the second aspect or sixth aspect, wherein the movement restricting means or the guide wall link means comprises an engaging protrusion formed on one of the B pillar garnish upper end portion and the airbag body expansion direction restricting means and an engaging hole formed on the other, which the engaging protrusions engages, and the engaging protrusion has a tapered face so that the width of a front end thereof is smaller than the width of a proximal portion thereof, the engaging protrusion being caught by the engaging hole via the tapered face.

Therefore, when the upper end portion of the B pillar garnish attempts to move in a vehicle occupant compartment inner direction accompanied by the deformation of the vehicle body upon a side collision, the tapered face of the engaging protrusion locally engages the engaging hole, so that the engaging protrusion is fixed there. As a result, the engagement of the engaging protrusion and the engaging hole cannot be released easily thereby restricting movement of the upper end portion of the B pillar garnish in a vehicle occupant compartment inner direction further securely. Further, such an effect can be assured by a simple structure comprising only the tapered surface.

According to a tenth aspect of the present invention, there is provided a structure for mounting a head-protecting airbag body according to the second aspect or sixth aspect, wherein the movement restricting means or the guide wall link means comprises an engaging protrusion formed on one of the B pillar garnish upper end portion and the airbag body expansion direction restricting means and an engaging hole formed on the other, which the engaging protrusion engages, and the engaging protrusion has a tapered face so that the width of a front end thereof is smaller than the width of a root thereof, the engaging protrusion being formed in such a key shape that an engaging groove is formed at a proximal portion thereof.

Therefore, when the upper end portion of the B pillar garnish attempts to move in a vehicle occupant compartment inner direction accompanied by the deformation of the vehicle body upon a side collision, the engaging groove formed at the root of the engaging protrusion engages the engaging hole. As a result, the engagement of the engaging protrusion and the engaging hole can be maintained further securely.

According to an eleventh aspect of the present invention, there is provided a structure for mounting a head-protecting airbag body according to the second aspect, wherein the movement restricting means comprises an engaging protrusion formed so as to protrude on the airbag body expansion direction restricting means and an engaging hole formed on the B pillar garnish upper end portion and a brittle portion is formed on the airbag body expansion direction restricting means, so that when the airbag body inflates, the guide wall of the airbag body expansion direction restricting means is deformed downward with the brittle portion as a beginning point, thereby the engaging protrusion engaging the engaging hole.

Therefore, when the airbag body is expanded, the guide wall of the airbag body expansion direction restricting means is deformed downward with the brittle portion as a beginning point, so that the engaging protrusion engages the engaging hole formed on the B pillar garnish upper end portion. As a result, the movement of the B pillar garnish upper end portion in a vehicle occupant compartment inner direction can be reduced by using an inflation force of the airbag. Further, because the movement of the B pillar garnish upper end portion in a vehicle occupant compartment inner direction can be reduced, the B pillar garnish upper end portion does not have to be firmly fastened to the B pillar and the efficiency of assembling of the B pillar garnish is not reduced.

According to a twelfth aspect of the present invention, there is provided a structure for mounting a head-protecting airbag body according to the second aspect, wherein the movement restricting means comprises an engaging plate having an engaging protrusion movable downward relative to the airbag body expansion direction restricting means and an engaging hole formed on the B pillar garnish upper end portion, and the engaging plate is moved downward by an inflation force of the airbag body, thereby the engaging protrusion engaging the engaging hole.

Therefore, when the airbag body inflates, an inflation force of the airbag body acts upon the engaging plate, so that the engaging protrusion moves relatively downward. As a result, the engaging protrusion of the engaging plate engages the engaging hole on the B pillar garnish upper end portion. Thus, the movement of the B pillar garnish upper end portion can be further reduced by using the inflation force of the airbag body. Further, because the amount of movement of the B pillar garnish upper end portion in a vehicle occupant compartment inner direction can be reduced, the B pillar garnish upper end portion does not have to be firmly fastened to the B pillar and the efficiency of assembling of the B pillar garnish is never reduced.

According to a thirteenth aspect of the present invention, there is provided a structure for mounting a head-protecting airbag body according to the second aspect, wherein the movement restricting means comprises an engaging protrusion formed so as to protrude on the airbag body expansion direction restricting means and an engaging hole formed on the B pillar garnish upper end portion, and the guide wall of the airbag body expansion direction restricting means is slidable by a predetermined amount in a vertical direction.

Therefore, when the airbag inflates, the inflation force of the airbag body acts on the airbag body expansion direction restricting means, pressing down the guide wall of the airbag body expansion direction restricting means, so that the engaging protrusion engages the engaging hole on the B pillar garnish upper end portion. As a result, the amount of movement of the B pillar garnish upper end portion in a vehicle occupant compartment inner direction can be further reduced by utilizing the inflation force of the airbag body. Further, because the amount of movement of the B pillar garnish upper end portion in a vehicle occupant compartment inner direction can be reduced, the B pillar garnish upper end portion does not have to be firmly fastened to the B pillar and the efficiency of assembling of the B pillar garnish upper end portion is never damaged. Further because the guide wall of the airbag body expansion direction restricting means is slidable vertically by a predetermined amount, it is possible to moving the guide wall of the airbag body expansion direction restricting means vertically after the B pillar garnish upper end portion is mounted to the B pillar, so that the engaging protrusion of the airbag body expansion direction restricting means is preliminarily made to engage the engaging hole on the B pillar garnish upper end portion.

According to a fourteenth aspect of the present invention, there is provided a structure for mounting a head-protecting airbag body according to the first aspect, wherein the catching preventing means comprises a concave bottom portion formed on the upper end portion of the B pillar garnish and coming in contact with an inner panel of the B pillar; an assist grip for occupant in which a mounting portion thereof inserted in the concave portion is fastened to the inner panel of the B pillar by tightening means; and a terminal portion of a vehicle transverse direction outside portion of the roof head lining interposed between a mounting portion of the assist grip for an occupant and the airbag body.

Therefore, because the B pillar garnish upper end portion is fixed to the inner panel by the assist grip for occupant via the tightening means, when the airbag body inflates, the airbag body can be prevented from coming into contact with the B pillar garnish upper end portion by the mounting portion of the assist grip for occupant inserted in the concave portion formed in the B pillar garnish upper end portion. As a result, it is possible to prevent the airbag body from being caught by the B pillar garnish upper end portion or the B pillar garnish from coming out. Further, because the assist grip which is an existing interior component is used, there is not produced an increase of the quantity of necessary parts.

According to a fifteenth aspect of the present invention, there is provided a structure for mounting a head-protecting airbag body according to the fourteenth aspect, wherein a top face of the assist grip opposing the airbag body is a guide surface inclined downward inward of a vehicle occupant compartment.

Therefore, in addition to the contents of the fourteenth aspect, when the airbag body inflates, the airbag body is expanded smoothly along the guide surface formed on the top face of the assist grip.

BRIEF DESCRIPTION OF THE DRAWINGS

FIG. 6A is a perspective view of a vehicle occupant compartment viewed obliquely from the front showing a upper end portion of a B pillar garnish of a vehicle occupant compartment to which the structure for mounting a head-protecting airbag body according to the second embodiment of the present invention is applied, and FIG. 6B is a perspective view of a vehicle occupant compartment viewed obliquely from the front showing a upper end portion of a B pillar garnish of a vehicle occupant compartment to which a structure for mounting head-protecting airbag body according to a modified example of the second embodiment of the present invention is applied.

FIG. 7 is a sectional view corresponding to FIG. 1 of a structure for mounting a head-protecting airbag body according to a third embodiment of the present invention.

FIG. 32 is a diagram for explaining an operation of the structure for mounting a head-protecting airbag body according to the eleventh embodiment of the present invention.

FIG. 33 is a perspective view of the B pillar top portion viewed obliquely from the rear inside of a vehicle in which a structure for mounting a head-protecting airbag body according to a twelfth embodiment of the present invention is applied.

FIG. 34 is a sectional view substantially corresponding to FIG. 1 showing a upper end portion of a B pillar garnish of a vehicle occupant compartment to which a conventional structure for mounting a head-protecting airbag body is applied.

DESCRIPTION OF THE PREFERRED EMBODIMENTS

A first embodiment of a structure for mounting a head-protecting airbag body of the present invention will be described with reference to FIGS. 1 to 4.

An arrow FR of the Figure indicates the forward direction of a vehicle, an arrow UP indicates the upward direction thereof and an arrow IN indicates the vehicle transverse inner direction.

Figure 4:
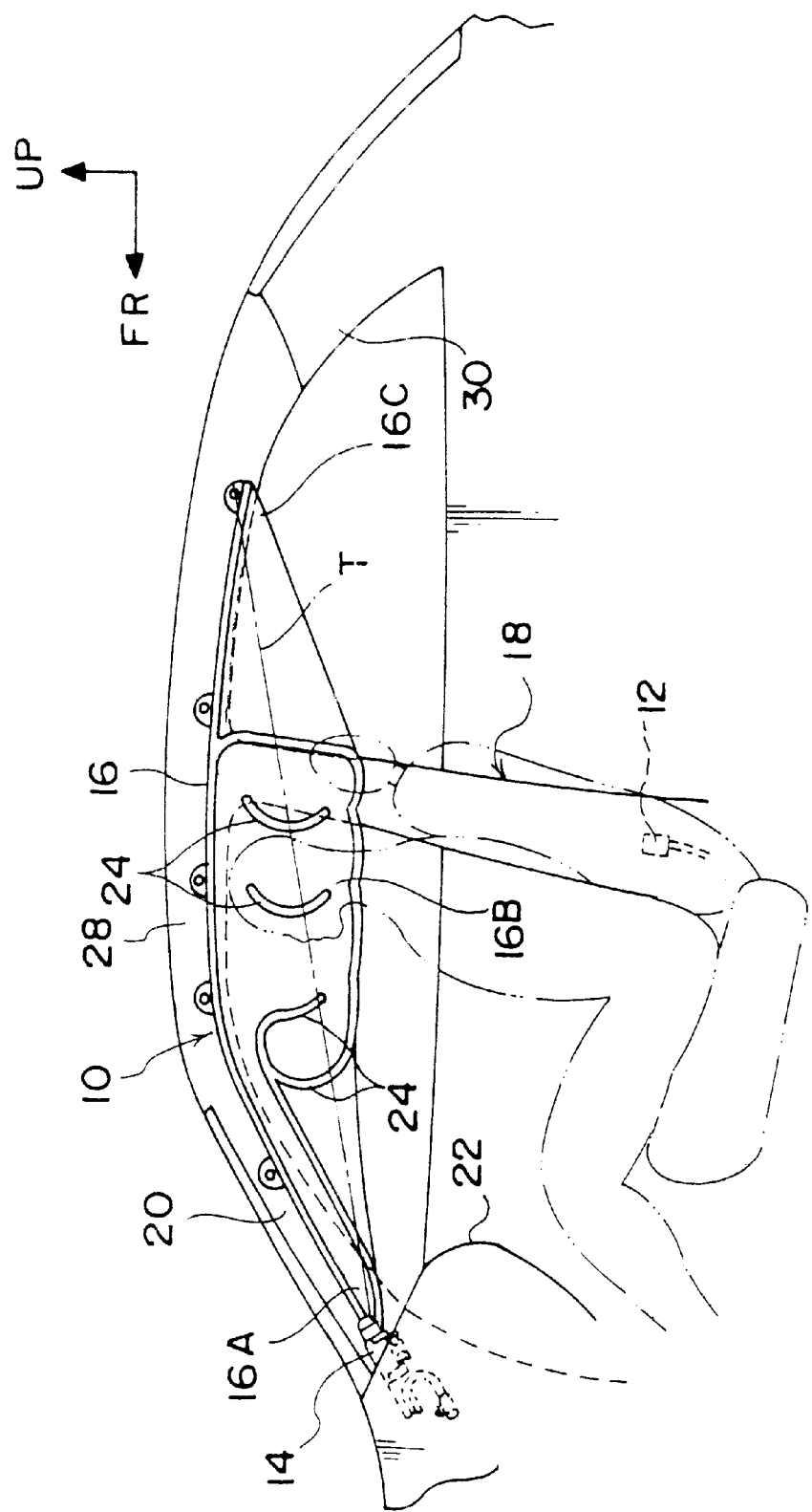
FIG. 4 is a schematic side view showing a state where an airbag body is fully expanded on a side face of a driver's seat of a vehicle occupant compartment to which the structure for mounting a head-protecting airbag body according to the first embodiment of the present invention is applied.

As shown in FIG. 4, a head-protecting airbag apparatus 10 comprises a sensor 12 for detecting a side collision, a cylindrical inflator 14 which injects gas when it is activated, and an airbag body 16. The sensor 12 is disposed near a bottom end portion of the B pillar (center pillar) 18 and detects a side collision when a side collision load larger than a predetermined value is applied to the vehicle side portion.

An inflator 14 is disposed near a joint portion between an A pillar (front pillar) 20 and a dashboard 22 and connected to the aforementioned sensor 12. If the sensor 12 detects a side collision, the inflator 14 is actuated.

A plurality of non-inflating portions 24 are formed at predetermined intervals at a middle portion of the airbag body 16 in a vertical direction such that the vertical direction of each non-inflating portion 24 intersect a tension line T connecting a front end fixing point of the airbag body 16 and a rear end fixing point thereof is a length direction of each of the non-inflating portions 24. When the airbag body is expanded, a plurality of inflating portions crossing the tension line T are formed through the non-inflating portions 24.

A front end portion 16A of the airbag body 16 is disposed at a position where the inflator 14 is disposed such that gas injected from the inflator 14 flows therein. A top edge portion of the middle portion 16B of the airbag body 16 is disposed along the A pillar 20 and a roof side rail 28. A rear end portion 16C is disposed near a C pillar (quarter pillar) 30.

Figure 3:
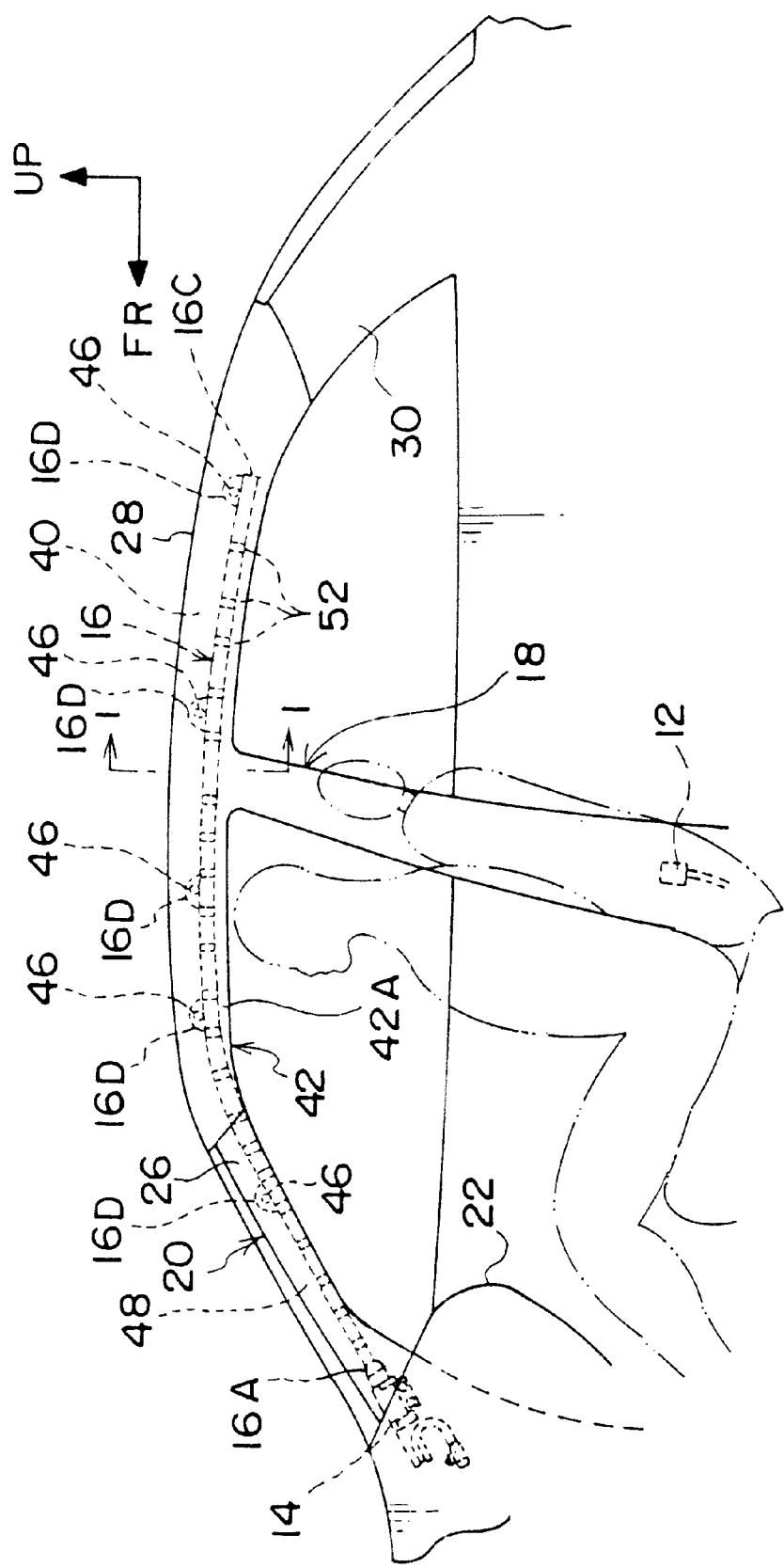
FIG. 3 is a schematic side view showing a state where a airbag body is stored on a side face of a driver's seat of a vehicle occupant compartment to which the structure for mounting a head-protecting airbag body according to the first embodiment of the present invention is applied as seen form the side of the vehicle.

As shown in FIG. 3, the airbag body 16 is formed into an elongated body by being folded in a generally vertical bellows or accordion form, and is accommodated over the A pillar garnish 26 and a vehicle transverse direction outer portion 42A of the roof head lining 42.

Figure 1:
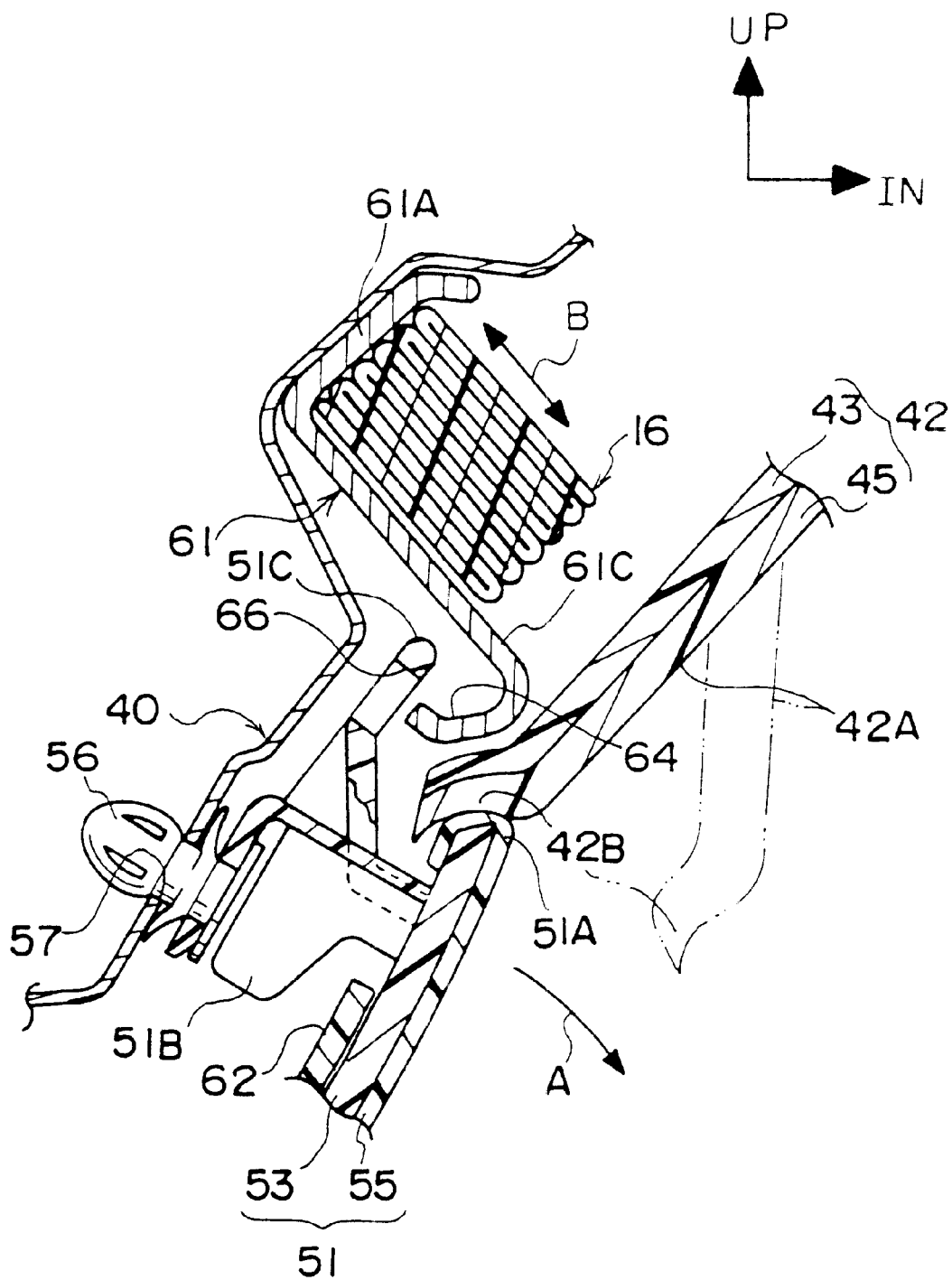
FIG. 1 is an enlarged sectional view taken along line 1—1 of FIG. 3.

As shown in FIG. 1, the airbag body 16 is accommodated between an inner rail panel 40 and the vehicle transverse direction outer portion 42A of a roof head lining 42. The airbag body 16 is folded generally at a right angle with respect to a vehicle occupant compartment inner side face of the B pillar garnish 51 (the direction of arrow B in FIG. 1). The airbag body 16 is held in a folded state by tapes 52 (see FIG. 3) disposed at predetermined intervals and when the airbag body 16 inflates, these tapes 52 are broken easily by an expanding inflation force of the airbag body 16.

As shown in FIG. 3, mounting portions 16D are formed in a protruding manner at predetermined intervals at a upper end portion of the airbag body 16. The airbag body 16 is fixed at a side portion of the vehicle occupant compartment of an A pillar inner panel 48 and the rail inner panel 40 by fixing or fastening means 46 such as bolts passing through the mounting portions 16D and nuts meshing these bolts.

As shown in FIG. 1, the roof head lining 42 is made of resin and comprises a base material 43 and a surface skin 45. When the airbag body 16 inflates, the vehicle transverse direction outer portion 42A of the roof head lining 42 is opened inwards into the vehicle occupant compartment by an expanding inflation force of the airbag body 16 as indicated by two dots and dash line of FIG. 1 so that the airbag body 16 inflates in a vehicle occupant compartment inner direction through the gap thus formed. An edge portion 42B of the roof head lining 42 engages a upper end portion 51A of the B pillar garnish 51. When the airbag body is expanded, the engagement between the edge portion 42B of the roof head lining 42 and the upper end portion 51A of the B pillar garnish 51 is released by an inflation force of the airbag body 16.

The B pillar garnish 51 is made of resin and comprises a base material 53 and surface skin 55. A base seat 51B for mounting is provided on a top rear (vehicle occupant compartment outer face) of the B pillar garnish 51. A clip 56 is engaged with a top portion of this base seat 51B and this clip 56 is inserted into a mounting hole 57 provided in the inner panel 40 and fixed to the rail inner panel 40. A reference numeral 62 in FIG. 1 denotes a slide plate.

A jump base 61 is disposed as an airbag body expanding direction restricting means below the folded airbag body 16 and made of a metal plate of iron or the like or from an extruded resin material. The jump base 61 is disposed in a region opposing a upper end portion 51A of the B pillar garnish 51, preferably in a region from a position overlapping an assist grip or a card holder mounted on a front side of the B pillar 18 of the roof side rail 28 up to the upper end portion 51A of the B pillar garnish 51.

Figure 2:
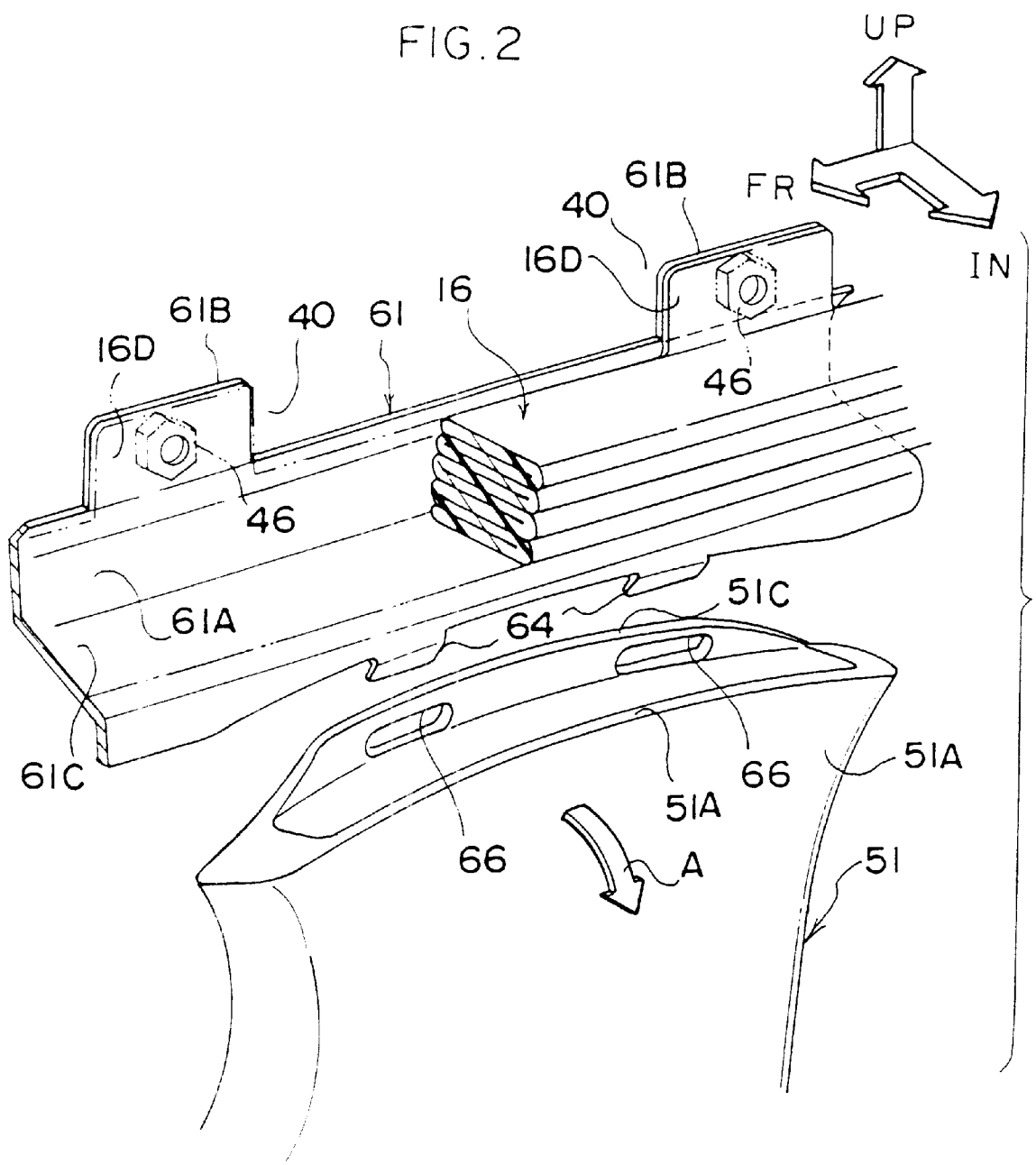
FIG. 2 is a perspective view of a vehicle occupant compartment viewed obliquely from the front showing a upper end portion of B pillar garnish of a vehicle occupant compartment to which a structure for mounting a head-protecting airbag body according to a first embodiment of the present invention is suitably applied.

As shown in FIG. 2, the jump base 61 is formed of a plate material bent in an L shape in sectional view. Front and rear mounting portions 61B formed at a upper end portion of a vertical wall portion 61A so as to protrude are fixed to the vehicle occupant compartment side portion of the rail inner panel 40 together with the mounting portions 16D of the airbag body 16 by the fixing means 46. The jump base 61 has a guide wall 61C which extends to a upper end portion 51A of the B pillar garnish 51 from a bottom end portion of the vertical wall portion 61A. A pair of plate-like engaging protrusions 64 spaced from each other along the vehicle longitudinal direction are formed at a distal end portion of the guide wall 61C as movement restricting means.

As shown in FIG. 1, a distal end portion of each engaging protrusion 64 is curved in a U shape pointing toward the upper outside portion of the vehicle transverse direction. A flange portion 51C formed on the upper end portion 51A of the B pillar garnish 51 is provided in a standing manner at a position facing the engaging protrusion 64 outside the engaging protrusions 64 in the vehicle transverse direction.

A pair of front and rear engaging holes 66 are formed in the flange portion 51C of the B pillar garnish 51 so as to correspond to the pair of engaging protrusions 64 as movement restricting means, as shown in FIG. 2, and these engaging holes 66 are elongated holes extending in the vehicle longitudinal direction. A relationship between the size of the engaging protrusion 64 and the size of the engaging hole 66 is set to be capable of securely restricting movement of the upper end portion 51A of the B pillar garnish towards a vehicle occupant compartment inner direction and diagonally towards a front or rear direction inside of the vehicle occupant compartment.

Next, an operation of this embodiment will be described.

According to this embodiment, when a side collision load larger than a predetermined value is applied to a vehicle side portion, the sensor 12 detects that a side collision has occurred. As a result, the inflator 14 is activated so that a predetermined amount of gas is injected therein. The airbag body 16 then begins to inflate, and, while the inflated airbag body 16 is pushing and opening the pillar garnish 26 of the A pillar 20 and the vehicle transverse direction outer side portion 42A of the roof head lining 42 in the vehicle occupant compartment inner direction, the airbag body 16 expands like a curtain downwards below the roof side rail 28 toward the rear of the vehicle from the front thereof. At this time, while is expanding from a position in the vicinity of the front of the B pillar 18 to a position past the intermediate portion of the B pillar in the vehicle longitudinal direction, the airbag body 16 inflates in a vehicle occupant compartment inner direction along the guide wall 61C of the jump base 61. Therefore, it is possible to prevent the airbag body 16 from coming in strong contact with or from being caught by the upper end portion 51A of the B pillar garnish 51.

If the B pillar 18 is deformed at the time of a side collision, the clip 56 slips out of the mounting hole 57 of the rail inner panel 40, the upper end portion 51A of the B pillar garnish 51 attempts to move in a vehicle occupant compartment inner direction. However, if the upper end portion 51A of the B pillar garnish 51 moves slightly in a vehicle occupant compartment inner direction (the direction of arrow A in FIGS. 1 and 2), the engaging protrusions 64 of the jump base 61 engage the engaging holes 66 formed in the flange portion 51C of the B pillar garnish 51, thereby restricting movement of the upper end portion 51A of the B pillar garnish in a vehicle occupant compartment inner direction. Therefore, the airbag body 16 during expansion is never caught by the upper end portion 51A of the upper end portion 51A of the B pillar garnish 51 so that the airbag body 16 can expands securely between a predetermined side portion of the vehicle and a vehicle occupant. Further, this embodiment can be structured simply by forming the engaging protrusions 64 and the engaging holes 66.

Further, by a relationship between the size of the engaging protrusion 64 and the size of the engaging hole 66, it is possible to securely restrict movement of the upper end portion 51A of the B pillar garnish in a vehicle occupant compartment inner direction and in the diagonally front and rear directions inside of the vehicle occupant compartment.

Next, a second embodiment of the structure for mounting a head-protecting airbag body of the present invention will be described with reference to FIGS. 5, 6A and 6B. The same reference numerals are attached to the same components as the first embodiment and description thereof is omitted.

According to this embodiment, as shown in FIG. 6A, a metal plate 68 made of iron or the like extending in the vehicle longitudinal direction is disposed as a different member from the B pillar garnish 51 on a upper end portion of the B pillar garnish 51.

Figure 5:
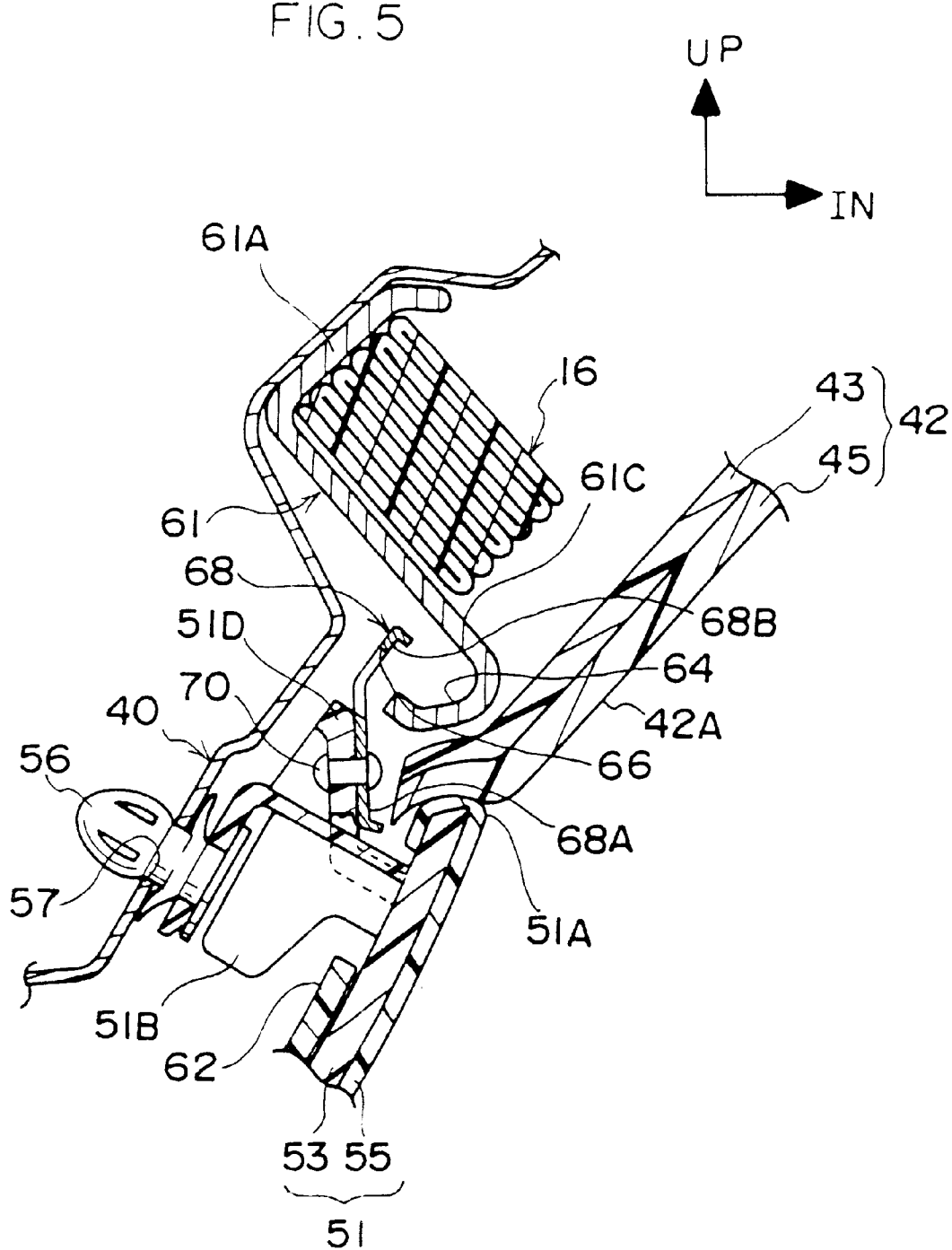
FIG. 5 is a sectional view corresponding to FIG. 1 in a structure for mounting a head-protecting airbag body according to a second embodiment of the present invention.

As shown in FIG. 5, a bottom portion 68A of a metal plate 68 is fixed to a mounting portion 51D formed on a back face of the upper end portion 51A of the B pillar garnish 51 using fixing means such as rivet or the like. A pair of front and rear engaging holes 66 are formed in a top portion 68B of the metal plate 68 and the engaging holes 66 engage the engaging protrusions 64 of the jump base 61.

Next, operation of this embodiment will be described.

Because according to this embodiment, in addition to an operation of the first embodiment, the engaging holes 66 are formed in the metal plate 68 fixed to the B pillar garnish 51, rigidity of peripheral portions of the engaging holes 66 is increased. As a result, engaging force between the engaging hole 66 and the engaging protrusion 64 can be increased, so that even if a large load is applied, the peripheral or edge portions of the engaging holes 66 can be prevented from being damaged or injured.

As shown in FIG. 6B, instead of the metal plate 68, it is permissible to crush both end portions of a steel wire 65 and make a through hole on each thereof and fix this steel wire 65 to the mounting portion 51D of the B pillar garnish 51 by fixing means 70 such as a rivet or the like.

Next, a third embodiment of the structure for mounting a head-protecting airbag body of the present invention will be described with reference to FIGS. 7 and 8. The same reference numerals are attached to the same components as the first embodiment and a description thereof is omitted.

Figure 8:
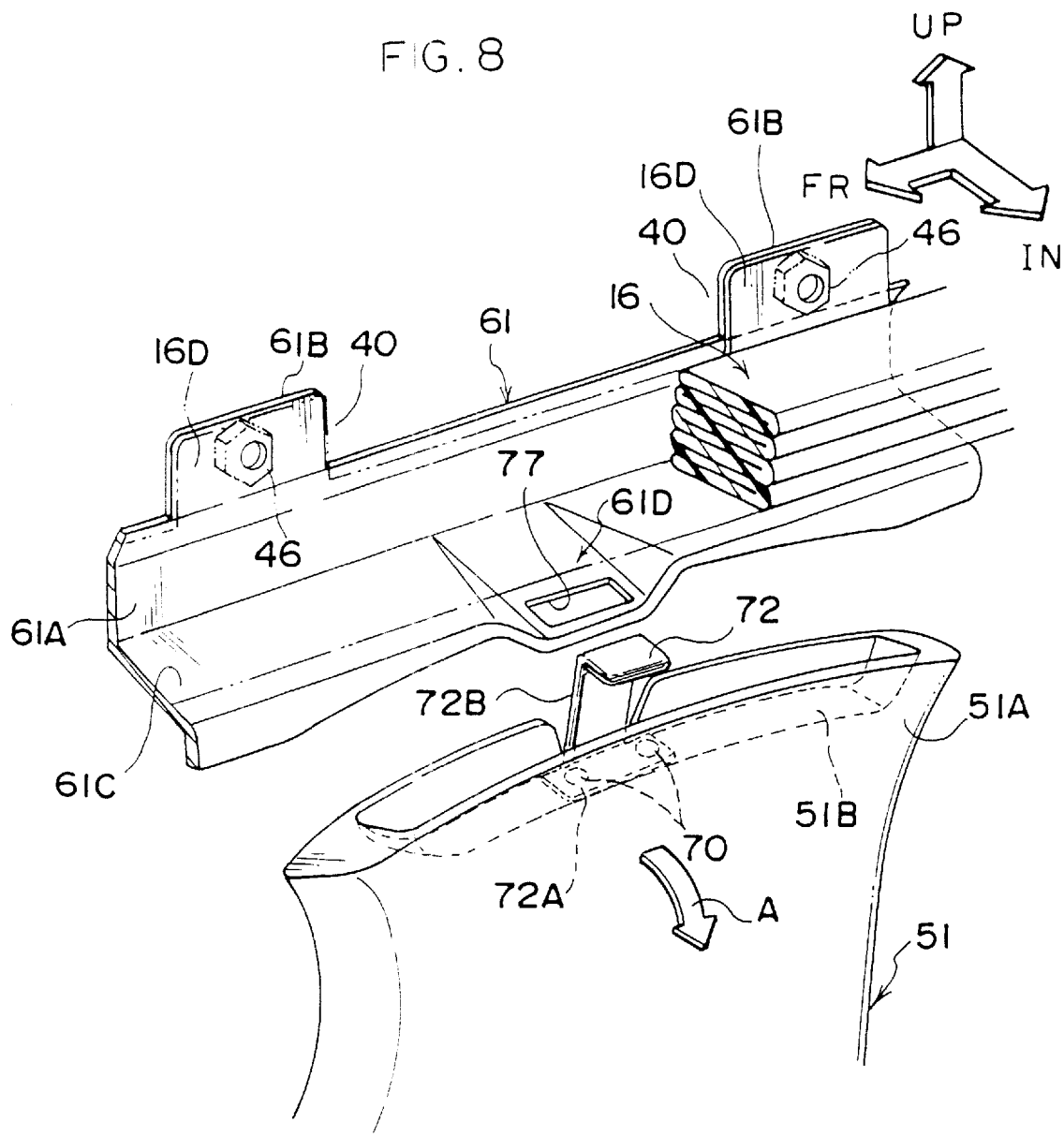
FIG. 8 is a perspective view of a vehicle occupant compartment viewed obliquely from the front showing a upper end portion of a B pillar garnish of a vehicle occupant compartment to which the structure for mounting a head-protecting airbag body according to the third embodiment of the present invention is applied.

As shown in FIG. 8, according to this embodiment, a plate 72 which is a different member from the B pillar garnish 51 is disposed on the upper end portion 51A of the B pillar garnish 51.

As shown in FIG. 7, the plate 72 comprises a metal plate 74 made of iron or the like and a coating layer 76 such as PVC applied on this metal plate 74. No coating layer 76 is formed on a lower portion 72A of the plate 72. The lower portion 72A of the plate 72 is fixed to the base seat S1B of the B pillar garnish 51 by fixing means 70 such as a rivet or the like. A top end of the plate 72 is bent substantially in a vehicle occupant compartment inner direction so that it serves as an engaging protrusion 72B as moving restriction means.

As shown in FIG. 8, a concave portion 61D which is hollow in a downwards direction is formed in the middle portion in the longitudinal direction of a guide wall 61C of the jump base 61 and an engaging hole 77 is formed as movement restricting means in the bottom of this concave portion 61D. This engaging hole 77 is an elongated hole extending in the vehicle longitudinal direction. If the upper end portion 51A of the B pillar garnish 51 moves slightly in a vehicle occupant compartment inner direction (the direction of arrow A in FIGS. 7 and 8), an engaging protrusion 72B of a plate 72 fixed to the B pillar garnish 51 engages the engaging hole 77 formed in the jump base 61 thereby restricting a motion of the upper end portion 51A of the B pillar garnish in a vehicle occupant compartment inner direction.

Next, operation of this embodiment will be described.

Because according to this embodiment, in addition to the operation of the first embodiment, the engaging protrusion 72B is formed on the plate 72 made of the metal plate 74 coated with the coating layer 76, the rigidity of the engaging protrusion 72B is increased. As a result, an engaging force between the engaging hole 77 and engaging protrusion 72 can be increased and if a large load is applied, the engaging protrusion 72 can be prevented from being damaged.

Further, because the engaging hole 77 is formed in the bottom of the concave portion 61D formed in the guide wall 61C of the jump base 61, the engaging protrusion 72B of the plate 72 engaging the engaging hole 77 does not easily interfere with the airbag body 16. Further because the engaging protrusion 72B of the plate 72 is covered with the coating layer 76, the airbag body 16 can be protected from edges of the metal plate 74.

Next, a fourth embodiment of the structure for mounting a head-protecting airbag body of the present invention will be described with reference to FIGS. 9 and 10.

The same reference numerals are attached to the same components as the first embodiment and a description thereof is omitted.

Figure 10:
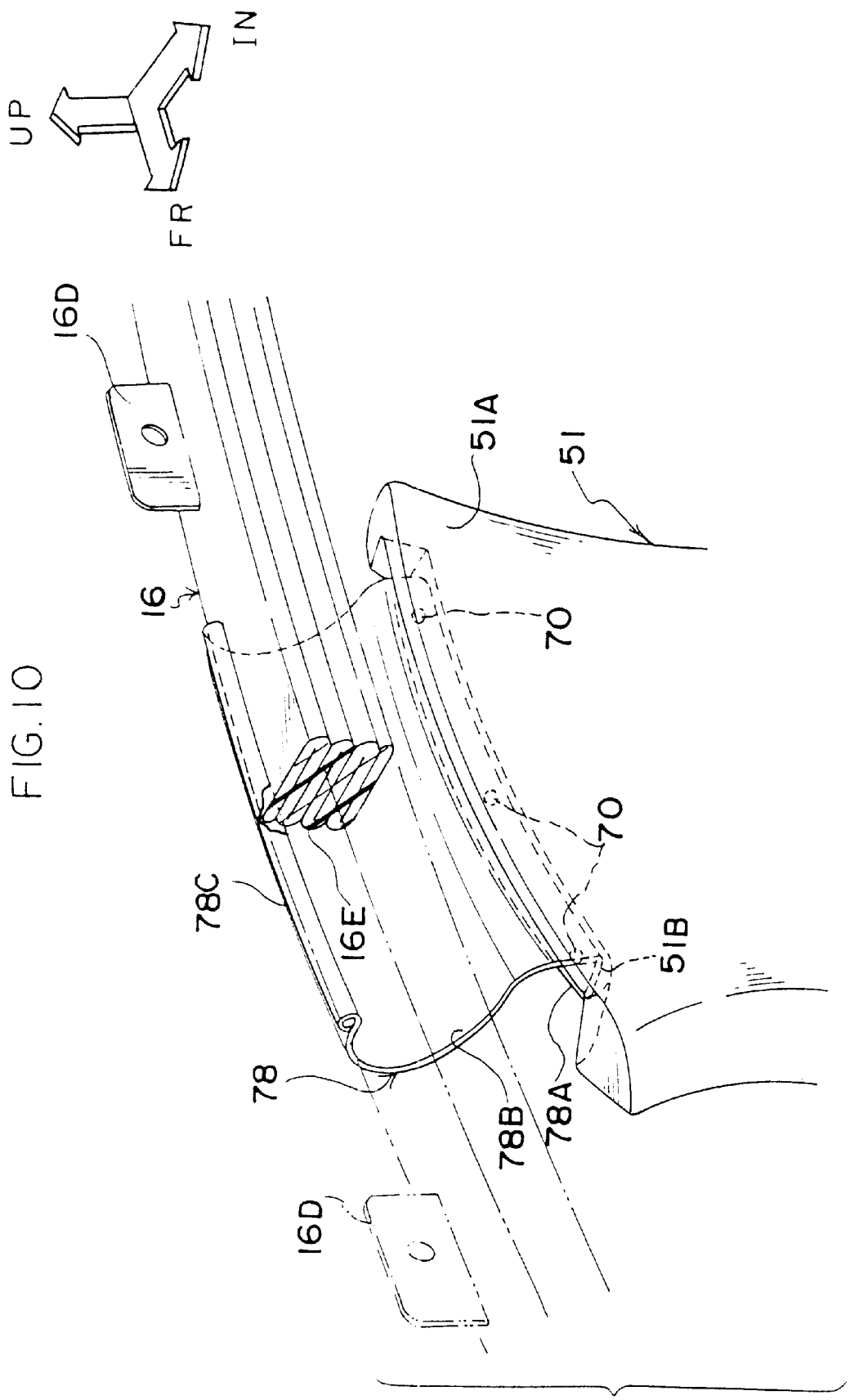
FIG. 10 is a perspective view of a vehicle occupant compartment viewed obliquely from the front showing a upper end portion of B pillar garnish of a vehicle occupant compartment to which a structure for mounting a head-protecting airbag body according to a fourth embodiment of the present invention is applied.

As shown in FIG. 10, according to this embodiment, a plate 78 made of metal such as iron or the like which serves as airbag body link means as well as airbag body expansion restricting means is disposed on the upper end portion 51A of the B pillar garnish 51.

A lower portion 78A of the plate 78 is fastened to the base seat 51B of the B pillar garnish 51 via fixing means 70 such as rivets or the like. A upper portion of the plate 78 is an engaging portion 78B. This engaging portion 78B extends so as to crawl in a vehicle occupant compartment outer side face (back face) of the folded airbag body 16. A front end 78C of the engaging portion 78B is folded back in a direction in which the edge thereof does not interfere with the airbag body 16. A portion between the lower portion 78A and the engaging portion 78B of the plate 78 serves as a guide wall 78D for guiding the expanding air bag body 16 in a vehicle occupant compartment inner direction.

Next, operation of this embodiment will be described.

Figure 9:
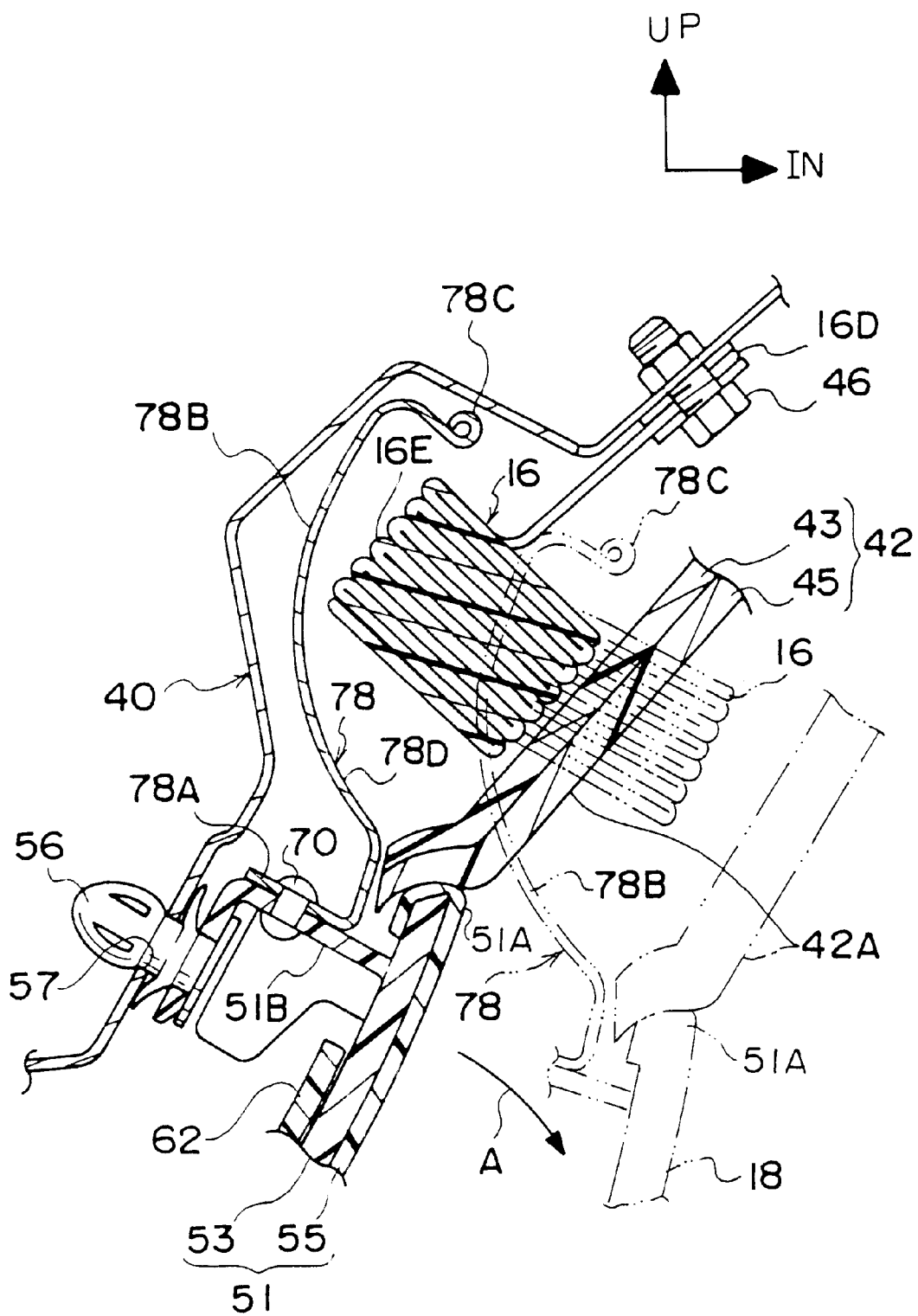
FIG. 9 is a sectional view corresponding to FIG. 1 of the structure for mounting a head-protecting airbag body according to a fourth embodiment of the present invention.

According to this embodiment, when the B pillar 18 is deformed upon a side collision, the upper end portion 51A of the B pillar garnish 51 attempts to move in a vehicle occupant compartment inner direction (the direction of arrow A of FIG. 9). If the upper end portion 51A of the B pillar garnish 51 moves slightly in a vehicle occupant compartment inner direction as indicated by the double dot dash line in FIG. 9, the engaging portion 78B of the plate 78 comes into contact with the outer side face 16E, in a vehicle transverse direction, of the airbag 16 so that the airbag body 16 is moved in a vehicle occupant compartment inner direction. As a result, the relationship between the airbag body 16 and the B pillar garnish 51 does not change largely. Thus, the airbag body 16 is not caught by the upper end portion 51A of the B pillar garnish 51 during inflation, so that the airbag body 16 can expands in a vehicle occupant compartment inner direction with respect to the B pillar garnish 51.

According to this embodiment, because the plate 78 having the guide wall 78D serves as airbag body expansion direction restricting means for the airbag body 16, by only adding the plate 78 to the upper end portion 51A of the B pillar garnish 51, the inflation of the airbag body 16 in a vehicle occupant compartment inner direction with respect to the B pillar garnish 51 can be ensured more securely.

Next, a fifth embodiment of a structure for mounting a head-protecting airbag body of the present invention will be described with reference to FIGS. 11 and 12.

The same reference numerals are attached to the same components as the second embodiment and description thereof is omitted.

Figure 12:
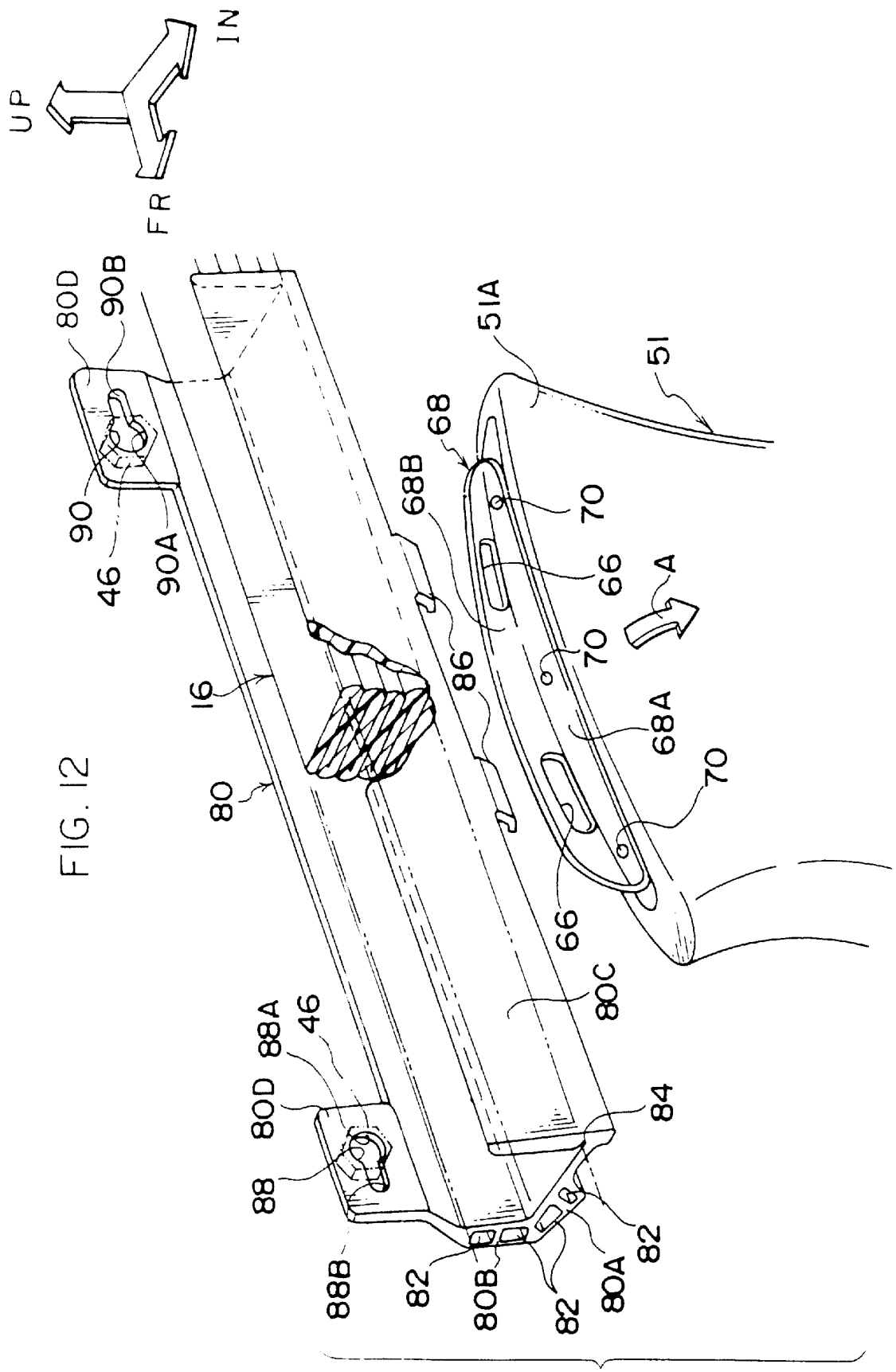
FIG. 12 is a perspective view of a vehicle occupant compartment viewed obliquely from the front showing a upper end portion of a B pillar garnish of a vehicle occupant compartment to which the structure for mounting a head-protecting airbag body according to the fifth embodiment of the present invention is applied.

As shown in FIG. 12, according to this embodiment, the guide plate 80 which is airbag body expansion direction restricting means is formed of a mild resin extruded material having a U-shaped section. A plurality of hollow portions 82 extending in the longitudinal direction of the guide plate 80 are formed by extrusion in a base portion 80A of the guide plate 80 and in a vertical wall portion 80B extended upward along the rail inner panel 40. Upon expansion of the airbag body, the guide plate 80 is bent along a concave groove 84 formed at the base portion 80A closer to the vehicle occupant compartment so that a guide wall 80C positioned along the vehicle transverse direction outer portion 42A of the roof head lining 42 expands in a vehicle occupant compartment inner direction.

A pair of front and rear plate-like engaging protrusions 86 are formed on a back face of the base portion 80A of the guide plate 80 closest to the vehicle occupant compartment and in the middle portion thereof in the vehicle longitudinal direction, as guide wall link means.

Figure 11:
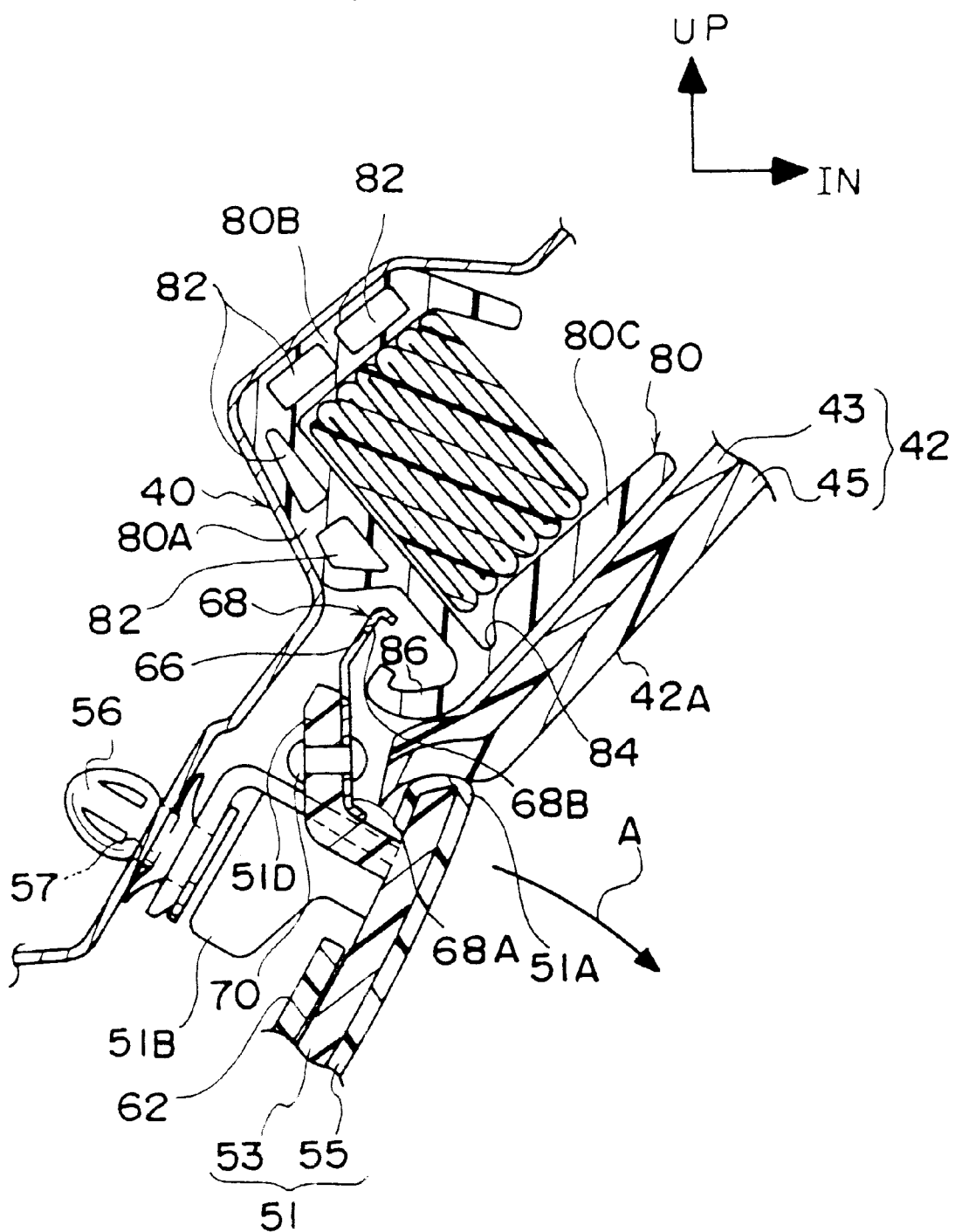
FIG. 11 is a sectional view corresponding to FIG. 1 of a structure for mounting a head-protecting airbag body according to a fifth embodiment of the present invention.

As shown in FIG. 11, the engaging protrusions 86, the metal plate 68 and the like are the same as in the second embodiment (FIGS. 5 and 6A).

As shown in FIG. 12, mounting portions 80D are formed so as to protrude at both ends, in the vehicle longitudinal direction, of the vertical wall portion 80B of the guide plate 80 and mounting holes 88, 90 are formed on the mounting portions 80D. In the front mounting hole 88, a narrow extending portion 88B is formed toward the front from a circular hole portion 88A through which fixing means such as a bolt or the like passes, and in the rear mounting hole 90, a narrow extending portion 90B is formed toward the rear from a circular hole portion 90A through which fixing means such as a bolt or the like passes.

Thus, for example, when a load is applied on the guide plate 80 in a vehicle occupant compartment inner direction via the engaging protrusions 86 of the guide plate 80, the pair of front and rear mounting portions 80D move to approach to each other while the intermediate portion, in the vehicle longitudinal direction, of the guide plate 80 is being bent in a vehicle occupant compartment inner direction. That is, the front mounting portion 80D of the guide plate 80 is moved in a vehicle rear direction such that the front fixing means 46 is positioned in the extending portion 88B from the circular hole portion 88A, while the rear mounting portion 80D of the guide plate 80 is moved in a vehicle front direction such that the rear fixing means 46 is positioned in the extending portion 90B from the circular hole portion 90A. Meanwhile, the airbag body 16 is accommodated with a slight allowance so that it is capable of moving in a vehicle occupant compartment inner direction.

Next, operation of this embodiment will be described.

According to this embodiment, when the B pillar 18 is deformed at the time of a side collision, the upper end portion 51A of the B pillar garnish 51 moves in a vehicle occupant compartment inner direction. When the upper end portion 51A of the B pillar garnish 51 moves slightly in a vehicle occupant compartment inner direction, the engaging holes 66 of the metal plate 68 fastened to the B pillar garnish 51 engages the engaging protrusions 86 of the guide plate 80, so that the engaging protrusions 86 are moved in a vehicle occupant compartment inner direction. At this time, the intermediate portion, in the vehicle longitudinal direction, of the guide plate 80 is pulled by the metal plate 68 to be bent in the vehicle occupant compartment inner direction, while the front and rear mounting portions 80D of the guide plate 80 are moved to approach to each other with respect to the fixing means 46. Thus, the airbag body 16 during inflation is never caught by the upper end portion 51A of the B pillar garnish 51 so that the airbag body 16 can inflate securely between a predetermined vehicle side portion and an occupant side portion.

According to this embodiment, there is provided a simple structure which allows the front mounting portion 80D and rear mounting portion 80D of the guide plate 80 to be movable relative to the rail inner panel 40.

Next, a sixth embodiment of a structure for mounting a head-protecting airbag body of the present invention will be described with reference to FIGS. 13 and 14.

The same reference numerals are attached to the same components as the fifth embodiment and a description thereof is omitted.

Figure 13:
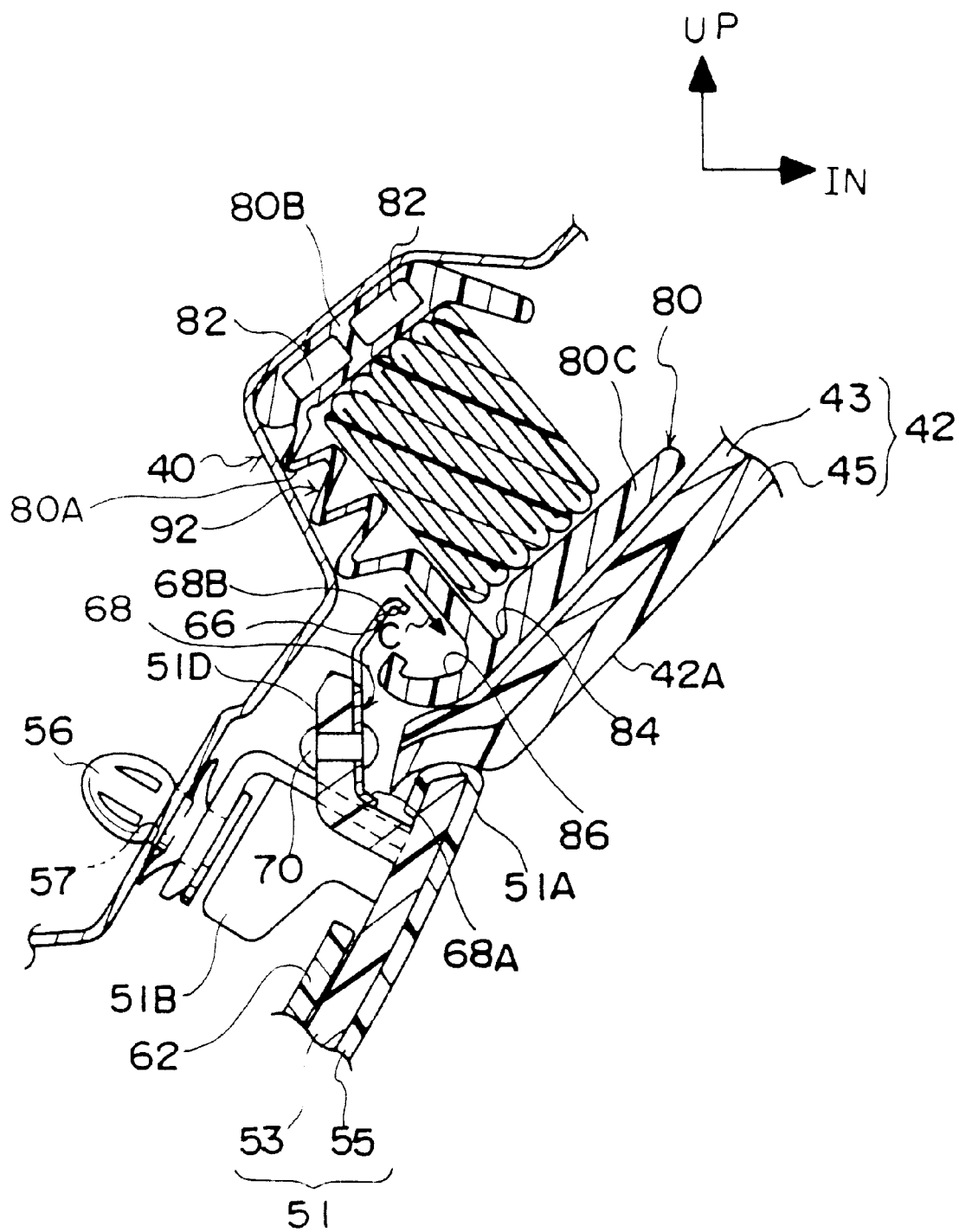
FIG. 13 is a sectional view corresponding to FIG. 1 of a structure for mounting a head-protecting airbag body according to a sixth embodiment of the present invention.

As shown in FIG. 13, according to this embodiment, a bellows portion 92 stretchable in a vehicle occupant compartment inner direction (the direction of arrow C in FIG. 13) is formed by extrusion on a base portion 80A of the guide plate 80 along the longitudinal direction of the guide plate 80. For example, when a tension load is applied on the guide plate via the engaging protrusions 86 of the guide plate 80 in a vehicle occupant compartment inner direction, the bellows portion 92 of the guide plate 80 is structured to be stretched in the vehicle occupant compartment inner direction (arrow in FIG. 13).

Figure 14:
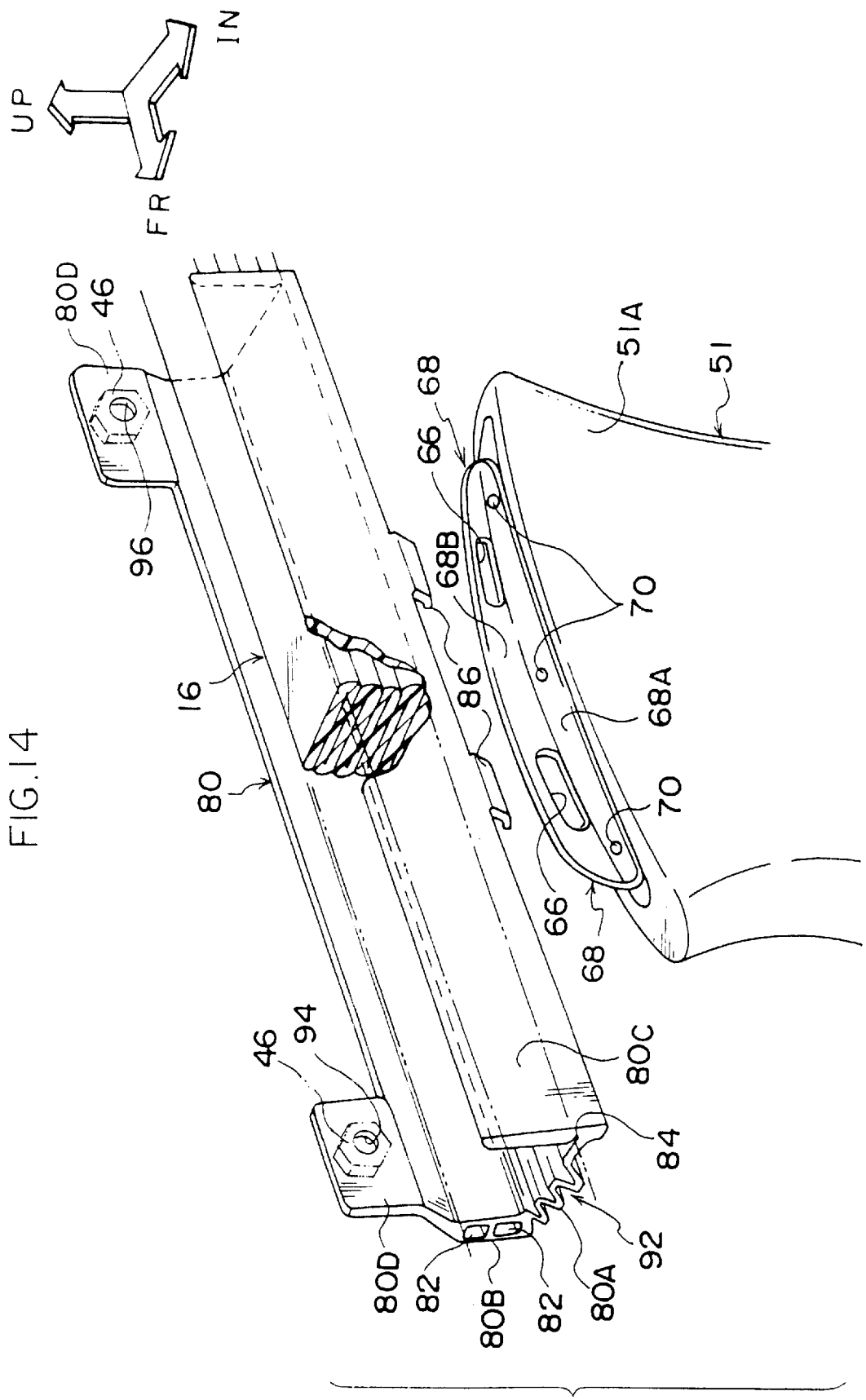
FIG. 14 is a perspective view of a vehicle occupant compartment viewed obliquely from the front showing a upper end portion of a B pillar garnish of a vehicle occupant compartment to which the structure for mounting head-protecting airbag body according to a sixth embodiment of the present invention is applied.

As shown in FIG. 14, according to this embodiment, mounting holes 94, 96 formed in the front and rear mounting portions 80D of the guide plate 80 are circular.

Next, operation of this embodiment will be described.

According to this embodiment, when the B pillar 18 is deformed upon a side collision, the upper end portion 51A of the B pillar garnish 51 moves in a vehicle occupant compartment inner direction. When the upper end portion 51A of the B pillar garnish 51 moves slightly in a vehicle occupant compartment inner direction, the engaging holes 66 formed in the metal plate 68 fastened to the B pillar garnish 51 engage the engaging protrusions 86 of the guide plate 80 so that the engaging protrusions 86 are moved in a vehicle occupant compartment inner direction. At this time, the bellows portion 92 of the guide plate 80 is stretched in a vehicle occupant compartment inner direction. As a result, a portion engaging the upper end portion 51A of the B pillar garnish 51 of the guide plate 80 moves in a vehicle occupant compartment inner direction together with the airbag body 16. Thus, the airbag body 16 during inflation is never caught by the upper end portion 51A of the B pillar garnish 51 so that the airbag body 16 can inflate securely between a predetermined vehicle side portion and an occupant side portion.

Further, this embodiment provides a simple structure in which the guide wall 80C can be deformed in a vehicle occupant compartment inner direction by the bellow portions 92 formed in the guide plate 80.

Next, a seventh embodiment of the structure for mounting a head-protecting airbag body of the present invention will be described with reference to FIGS. 15 to 17.

The same reference numerals are attached to the same components as the second embodiment and a description thereof is omitted.

Figure 16:
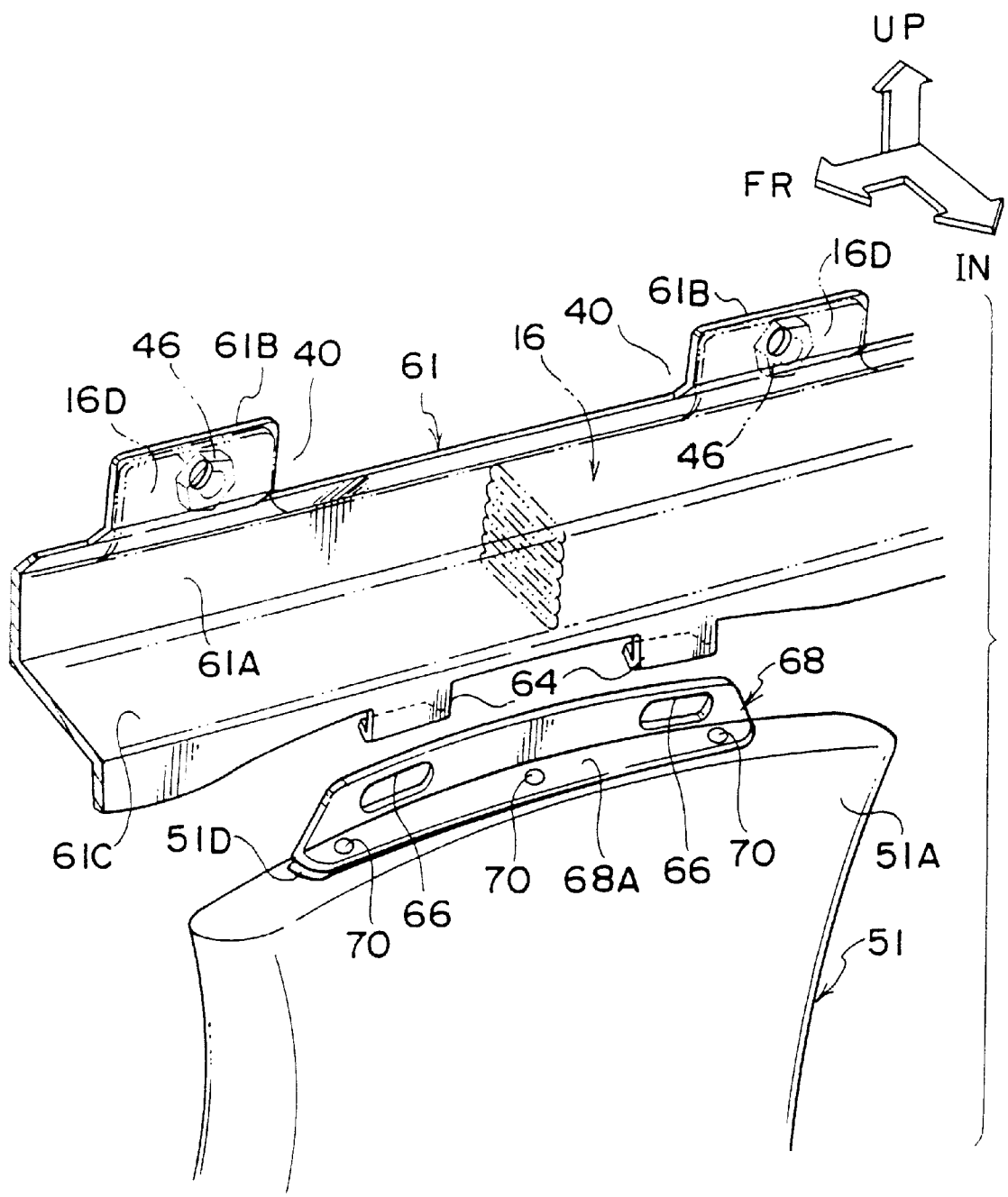
FIG. 16 is a perspective view of a vehicle occupant compartment viewed obliquely from the front showing a upper end portion of a B pillar garnish of a vehicle occupant compartment to which the structure for mounting a head-protecting airbag body according to the seventh embodiment of the present invention is applied.

As shown in FIG. 16, according to this embodiment, a pair of the plate-like engaging protrusions 64 are formed as movement restricting means and guide wall link means on the jump base 61 and a pair of the front and rear engaging holes 66 are formed in the metal plate 68 as the guide wall link means.

Figure 15:
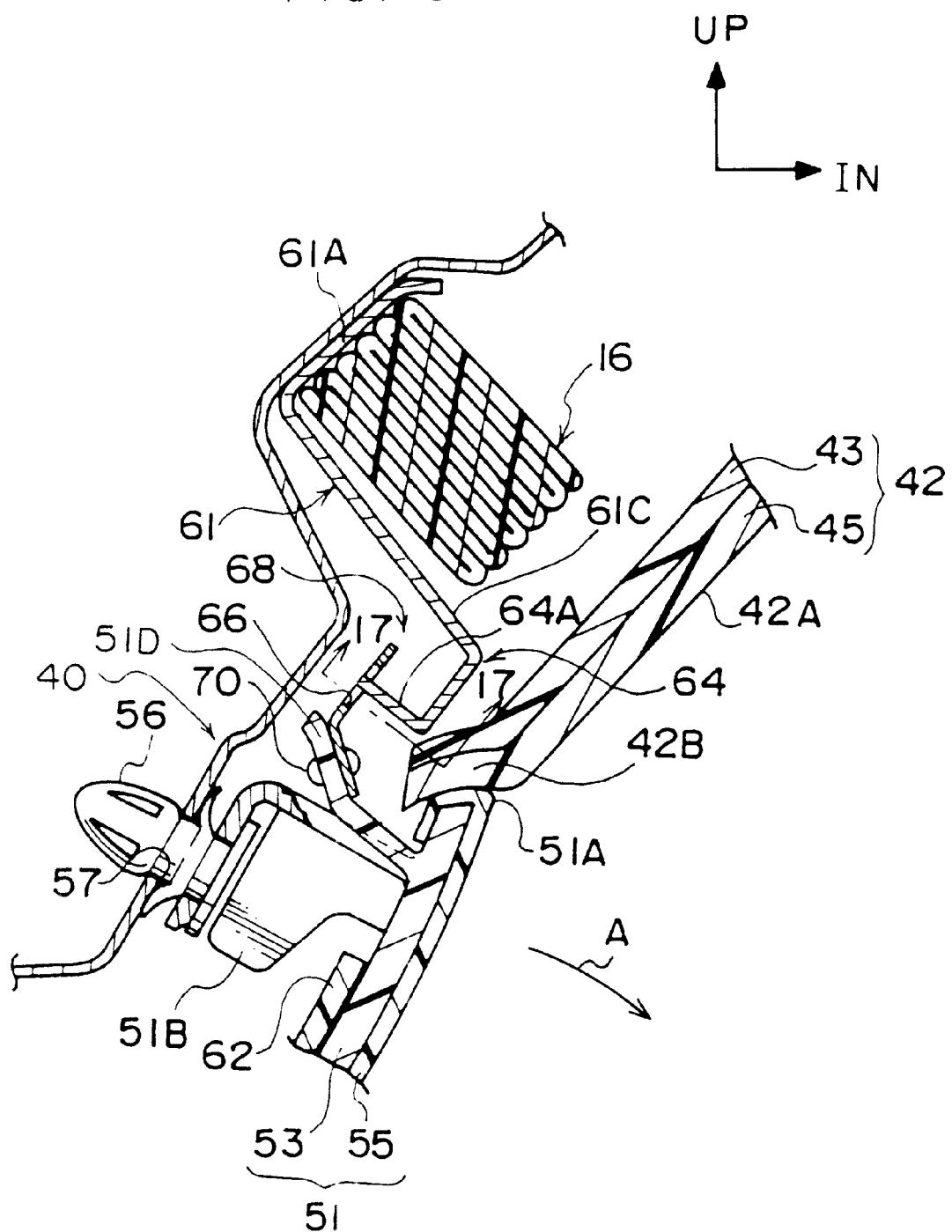
FIG. 15 is a sectional view corresponding to FIG. 1 of a structure for mounting a head-protecting airbag body according to a seventh embodiment of the present invention.

As shown in FIG. 15, according to this embodiment, each of the engaging protrusions 64 has a U-shaped section, so that a distal end portion 64A thereof enters into each of the engaging hole 66.

Figure 17:
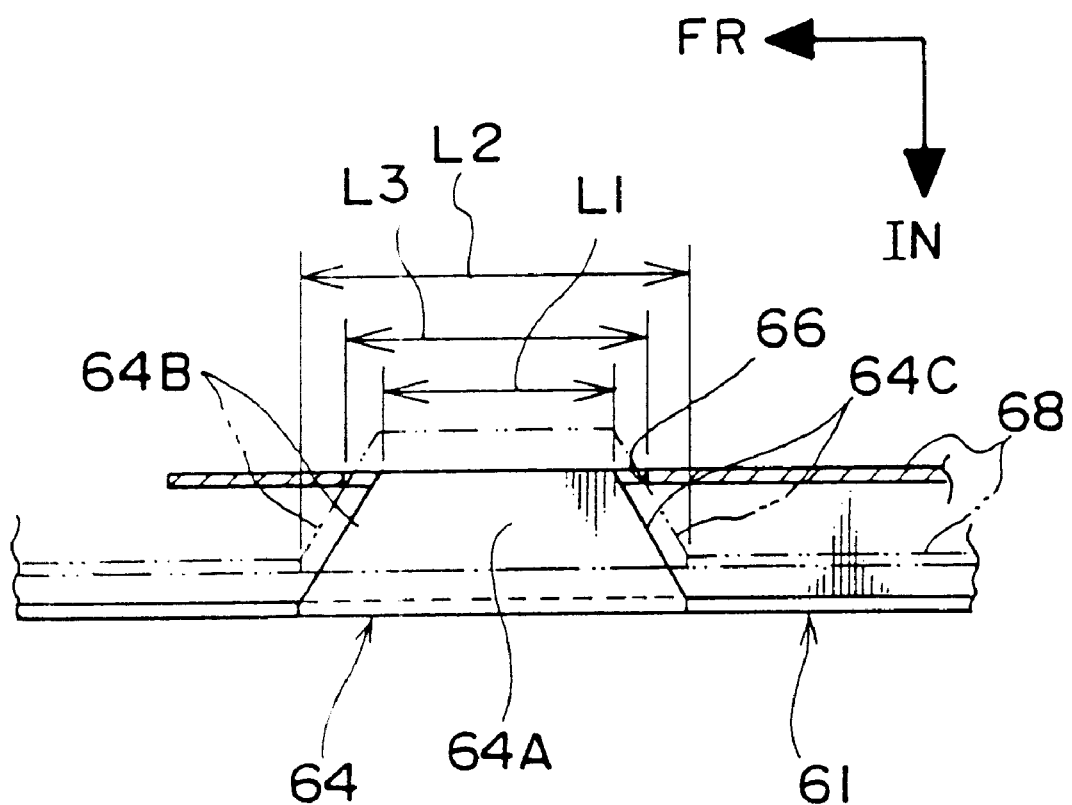
FIG. 17 is an enlarged sectional view taken along line 17—17 of FIG. 15.

As shown in FIG. 17, in the distal end portion 64A of the engaging protrusion 64, a width L1 of the distal end portion is smaller than a width L2 of the proximal portion and the engaging protrusion 64 has tapered faces 64B, 64C. The width L2 of the proximal portion is larger than the width L3 of the engaging hole 66. As a result, the engaging protrusion 64 engages an internal peripheral portion of the engaging hole 66 through the tapered faces 64B, 64C as indicated by double dot and dash line of FIG. 17.

Next, operation of this embodiment will be described.

According to this embodiment, when the B pillar 18 is deformed upon a side collision, the clip 56 slips out of the mounting hole 57 of the rail inner panel 40, so that the upper end portion 51A of the B pillar garnish 51 attempts to move in a vehicle occupant compartment inner direction. However, when the upper end portion 51A of the B pillar garnish 51 moves slightly in a vehicle occupant compartment inner direction (the direction of arrow A of FIG. 15), the engaging protrusions 64 of the jump base 61 engage the engaging holes 66 formed in the metal plate 68 fastened to the upper end portion 51A of the B pillar garnish 51, thereby restricting movement of the upper end portion 51A of the B pillar garnish in a vehicle occupant compartment inner direction. Therefore, the airbag body 16 during inflation is never caught by the upper end portion 51A of the B pillar garnish 51, so that the airbag body 16 can expands securely between a predetermined vehicle side portion and an occupant side portion. Further, this embodiment can be achieved by a simple structure comprising the engaging protrusions 64 and the engaging holes 66.

Also, according to this embodiment, the engaging protrusions 64 engage locally the internal peripheral portion of the engaging holes 66 via the tapered faces 64B, 64C so that the engaging protrusions 64 are fixed at those positions. As a result, the engagement between the both is not released easily so that movement of the upper end portion 51A of the B pillar garnish 51 in a vehicle occupant compartment inner direction can be restricted further securely. Further, such an effect can be assured by a simple structure in which each of the engaging protrusions 64 is provided with the tapered faces 64B, 64C.

Figure 18:
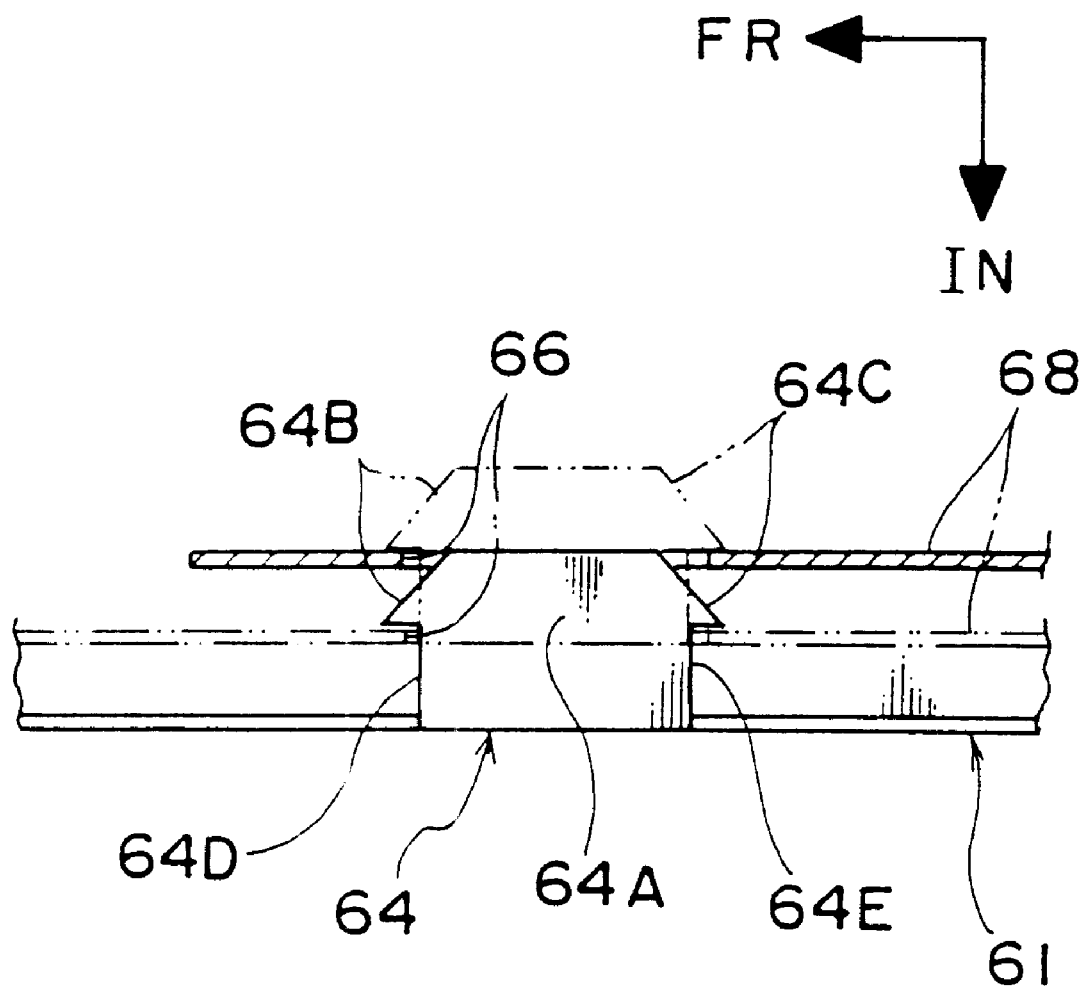
FIG. 18 is a sectional view corresponding to FIG. 17 of the structure for mounting a head-protecting airbag body according to the seventh embodiment of the present invention.

Although, according to this embodiment, the tapered faces 64B, 64C are formed on the engaging protrusion 64, instead of this it is permissible to form engaging grooves 64D, 64E at the proximal portions of the tapered faces 64B, 64C formed on the engaging protrusion 64 as shown in FIG. 18 so as to form a key shape. In this case, because the engaging grooves 64D, 64E of the engaging protrusion 64 engage the outer periphery of the engaging hole 66 as indicated by double dots and dash line, the engaging relationship between the both can be maintained further securely.

Next, an eighth embodiment of a structure for mounting a head-protecting airbag body of the present invention will be described with reference to FIGS. 19 to 21.

The same reference numerals are attached to the same components as the second embodiment, and a description thereof is omitted.

Figure 20:
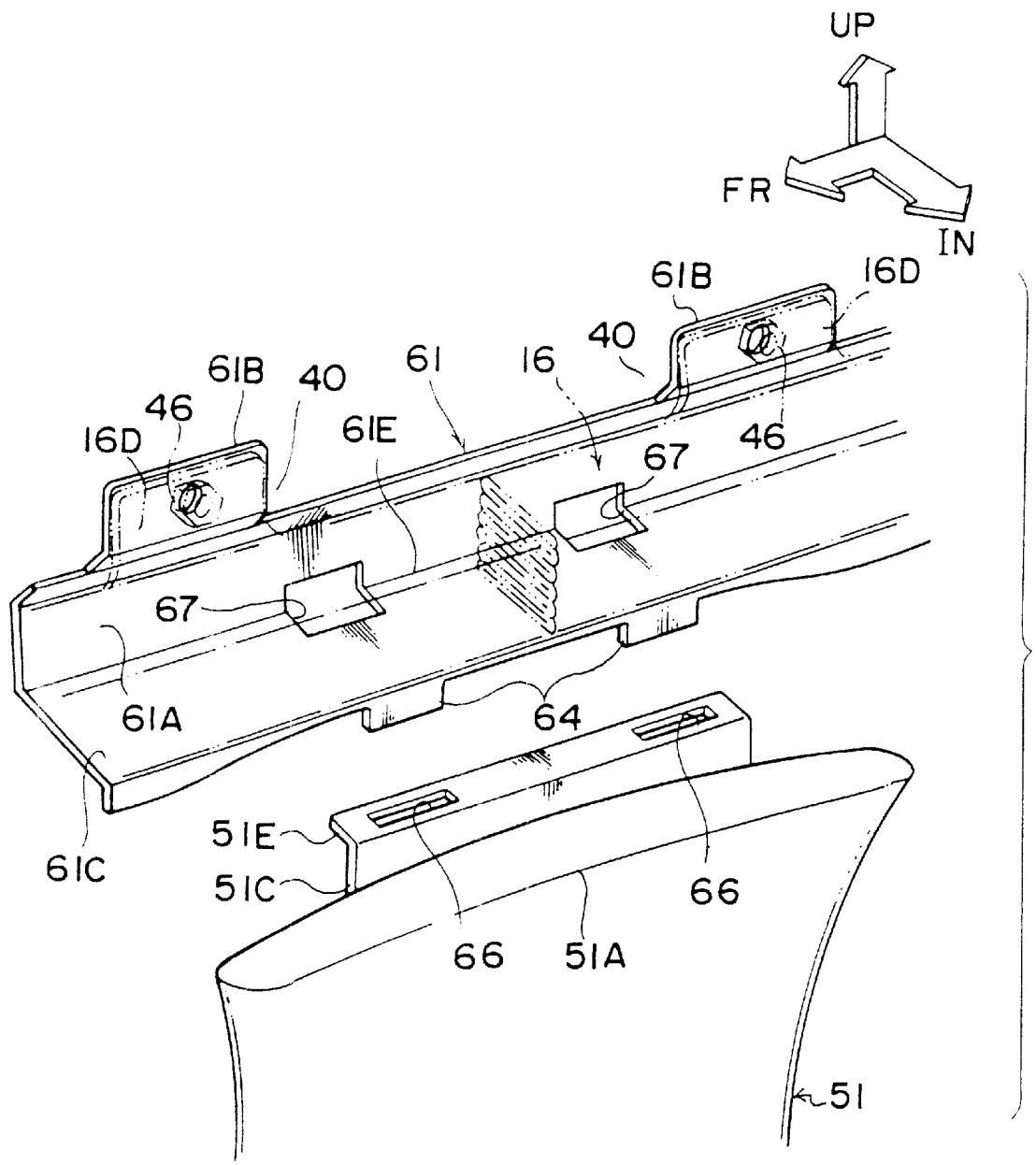
FIG. 20 is a perspective view of a vehicle occupant compartment viewed obliquely from the front showing a upper end portion of B pillar garnish of a vehicle occupant compartment to which the structure for mounting a head-protecting airbag body according to the eighth embodiment of the present invention is applied.

As shown in FIG. 20, according to this embodiment, cutout portions 67 extending over the vertical wall portion 61A and the guide wall 61C are formed at a predetermined interval in the longitudinal direction on the jump base 61 as airbag body expansion direction restricting means, so that a brittle portion 61E is formed on a border between the vertical wall portion 61A and the guide wall 61C. Therefore, when the airbag body 16 inflates, the guide wall 61C swings generally downward (the direction of arrow D of FIG. 21) with the brittle portion 61E as a beginning point by inflation pressure of the airbag body 16 as shown in FIG. 21.

Figure 19:
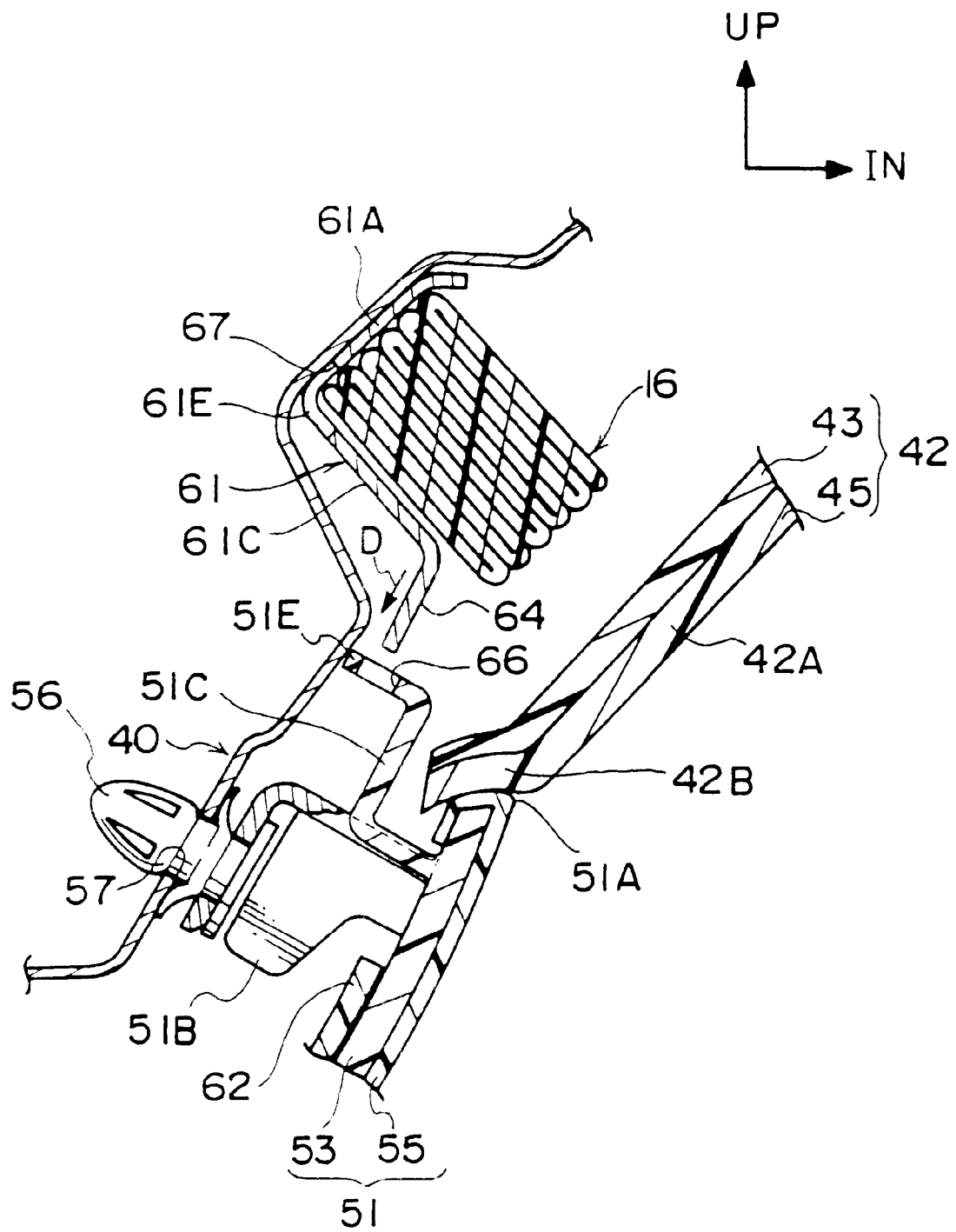
FIG. 19 is a sectional view corresponding to FIG. 1 of a structure for mounting a head-protecting airbag body according to an eighth embodiment of the present invention.

As shown in FIG. 19, an extending portion 51E is formed so as to direct outward of the compartment at a top end of the flange portion 51C formed on the upper end portion 51A of the B pillar garnish 51. A pair of the front and rear engaging holes 66 are formed in this extending portion 51E as movement restricting means. Therefore, when the guide wall 61C moves slightly generally downward (the direction of arrow D of FIG. 19), the engaging protrusions 64 of the jump base 61 engage the engaging holes 66 formed in the extending portion 51E of the B pillar garnish 51, thereby restricting movement of the upper end portion 51A of the B pillar garnish in a vehicle occupant compartment inner direction. Meanwhile, a relationship between the size of the engaging protrusion 64 and the size of the engaging hole 66 is set so as to be capable of securely restricting a movement of the upper end portion 51A of the B pillar garnish in a vehicle occupant compartment inner direction and in the diagonally longitudinal direction in a vehicle occupant compartment inner direction.

Next, operation of this embodiment will be described.

Figure 21:
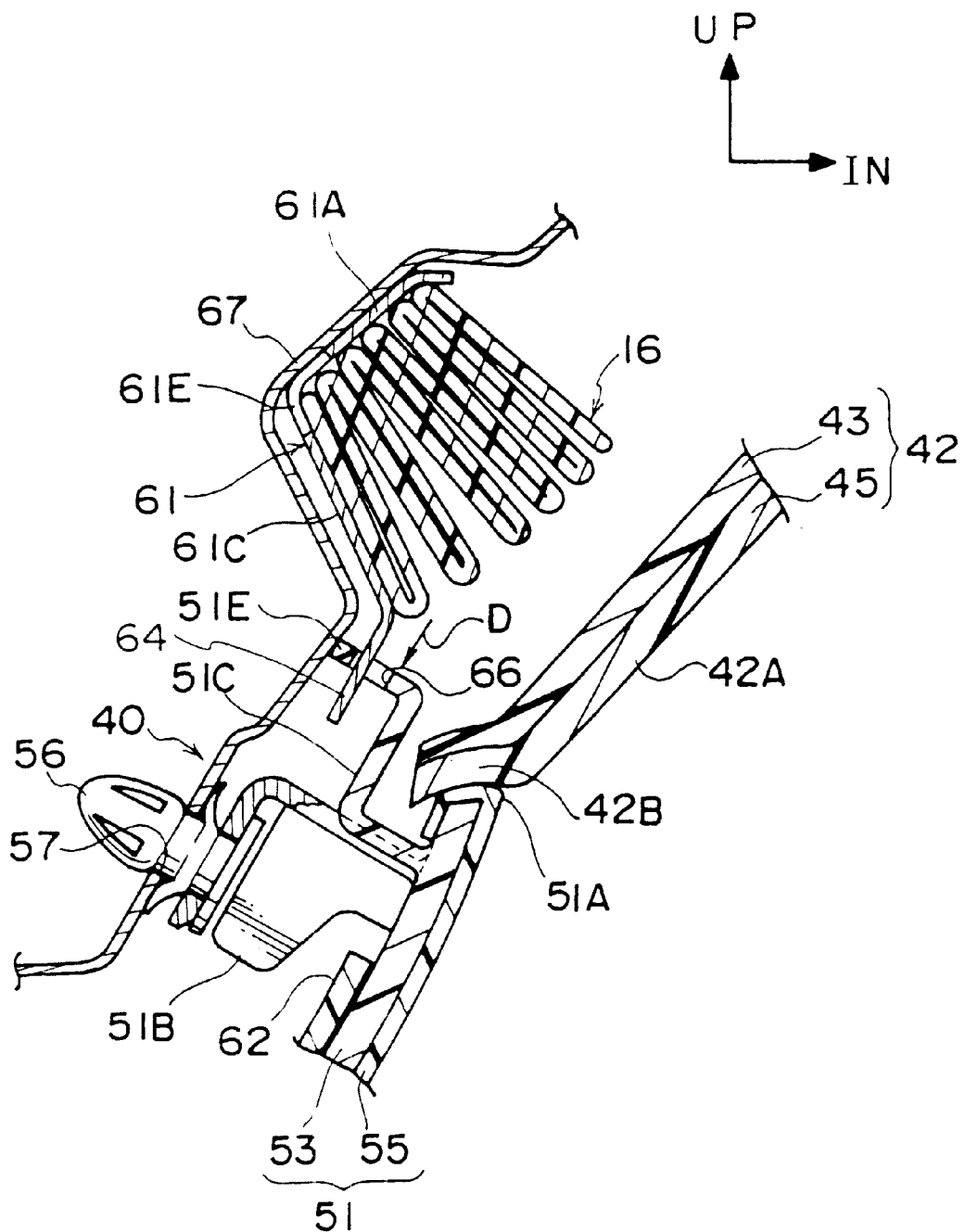
FIG. 21 is a sectional view for explaining an operation of the structure for mounting a head-protecting airbag body according to the eighth embodiment of the present invention.

According to this embodiment, when the airbag body 16 inflates, as shown in FIG. 21, the guide wall 61C swings generally (the direction of arrow D in FIG. 21) with the brittle portion 61E as the starting point by inflation force of the airbag body 16. As a result, the engaging protrusions 64 of the jump base 61 engage the engaging holes 66 formed in the extending portion 51E of the B pillar garnish 51, thereby limiting movement of the upper end portion 51A of the B pillar garnish in a vehicle occupant compartment inner direction. That is, because according to this embodiment, the engaging protrusions 64 engages the engaging holes 66 by using the inflation force of the airbag body 16, the amount of movement of the upper end portion 51A of the B pillar garnish in a vehicle occupant compartment inner direction can be reduced.

Further, because the amount of movement of the upper end portion 51A of the B pillar garnish in a vehicle occupant compartment inner direction can be reduced as described above, the upper end portion 51A of the B pillar garnish does not have to be firmly fastened to the rail inner panel 40 (B pillar inner panel) so that the efficiency of the assembly of the B pillar garnish 51 is never lost.

Figure 22:
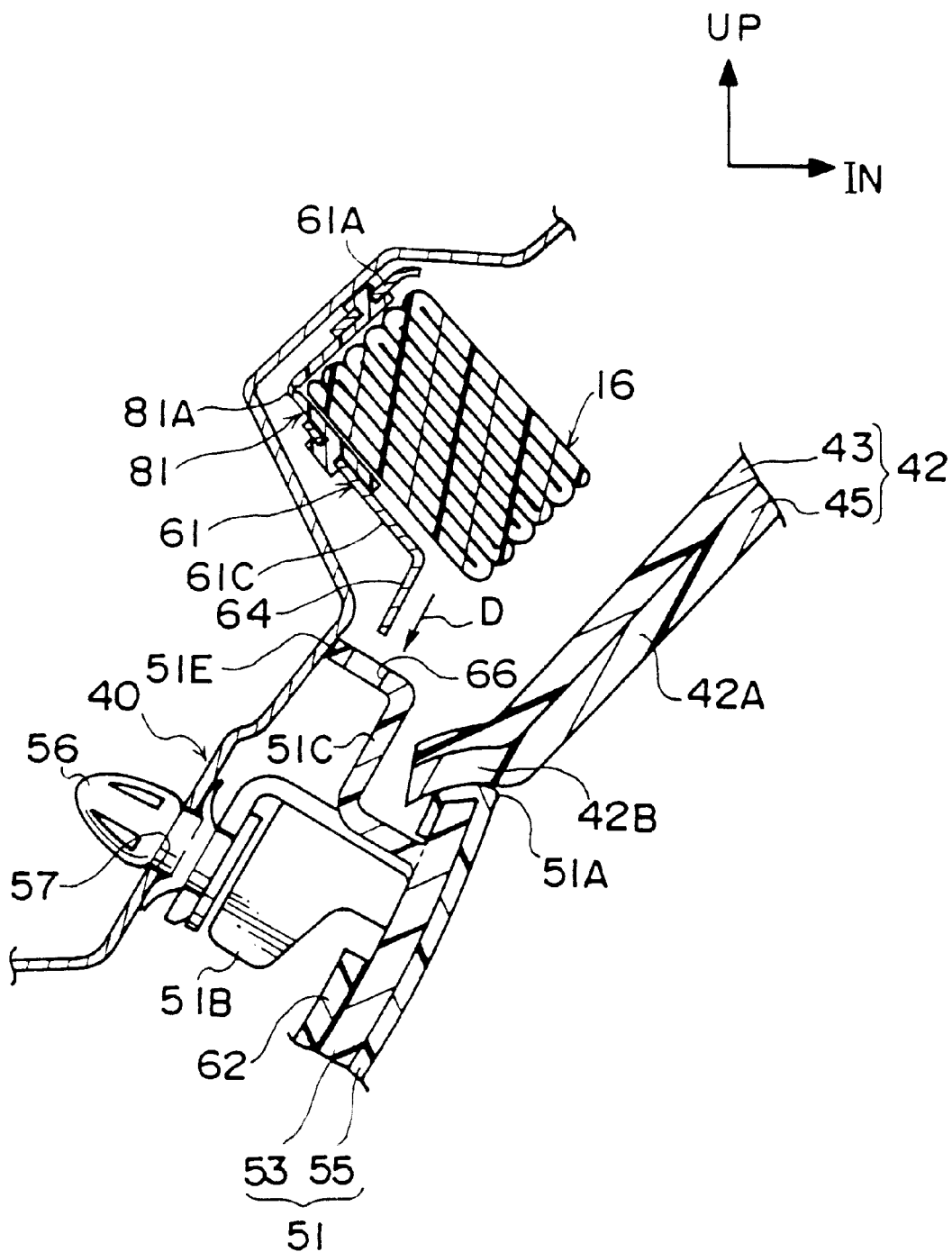
FIG. 22 is a sectional view corresponding to FIG. 19 of the structure for mounting a head-protecting airbag body according to the eighth embodiment of the present invention.
Figure 23:
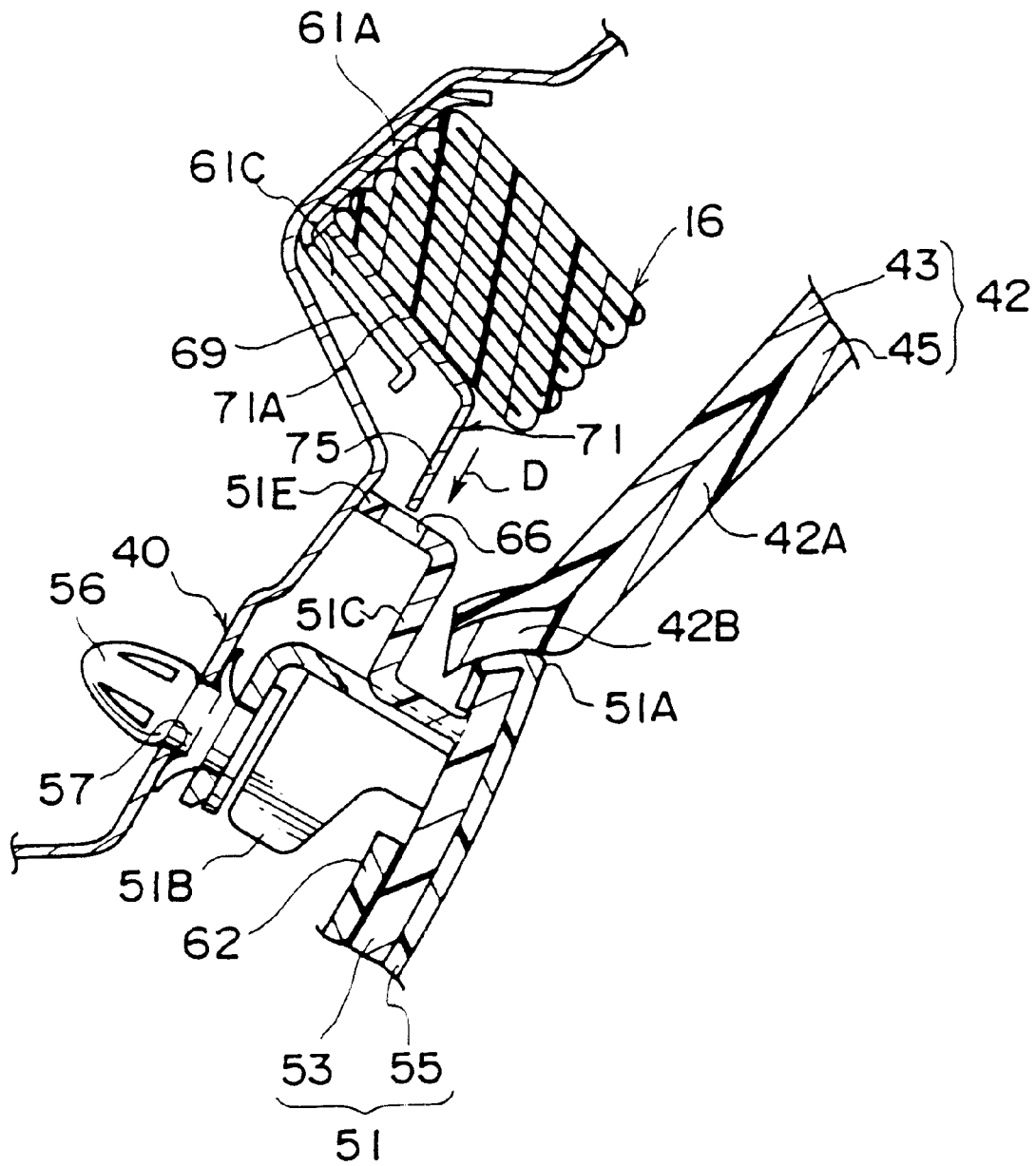
FIG. 23 is a sectional view corresponding to FIG. 1 of a structure for mounting a head-protecting airbag body according to a ninth embodiment of the present invention.

Although according to this embodiment, the brittle portion 61E is formed by the cutouts 67 extending over the vertical wall portion 61A and the guide wall 61C, instead of this it is permissible to insert-mold a resin plate member 81 having a brittle portion 81E by an integral hinge and link the vertical wall portion 61A with the guide wall 61C so as to have such a structure in which the guide wall 61C swings generally downward (the direction of arrow D in FIG. 22) with the brittle portion 81A as a starting point by inflation force of the airbag body 16.

Next, a ninth embodiment of a structure for mounting a head-protecting airbag body of the present invention will be described with reference to FIGS. 23 to 26.

The same reference numerals are attached to the same components as the eighth embodiment and a description thereof is omitted.

Figure 24:
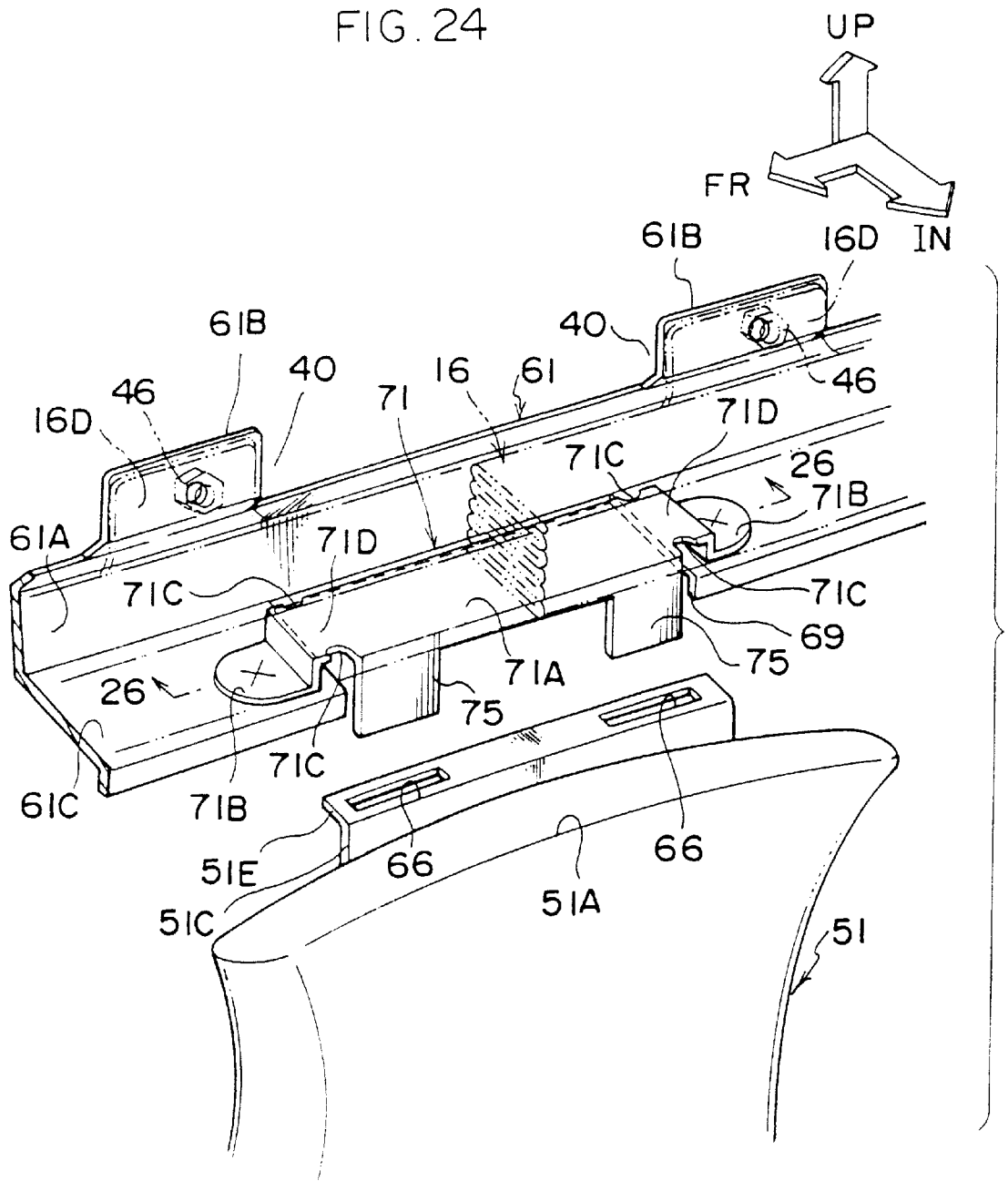
FIG. 24 is a perspective view of a vehicle occupant compartment viewed obliquely from the front showing a upper end portion of a B pillar garnish of a vehicle occupant compartment to which the structure for mounting a head-protecting airbag body according to the ninth embodiment of the present invention is applied.

As shown in FIG. 24, according to this embodiment, a rectangular cutout 69 is formed in the guide wall 61C of the jump base 61 as airbag body expansion direction restricting means and an engaging plate 71 constituting a part of the jump base 61 is disposed at a position opposing this cutout 69. Both end portions 71B, in the length direction of a guide wall portion, 71A of the engaging plate 71 melt-adhere to a top surface of the guide wall 61C and a brittle portion 71D having cutouts 71C on both sides in the width direction is provided near each of the both end portions 71B.

Figure 25:
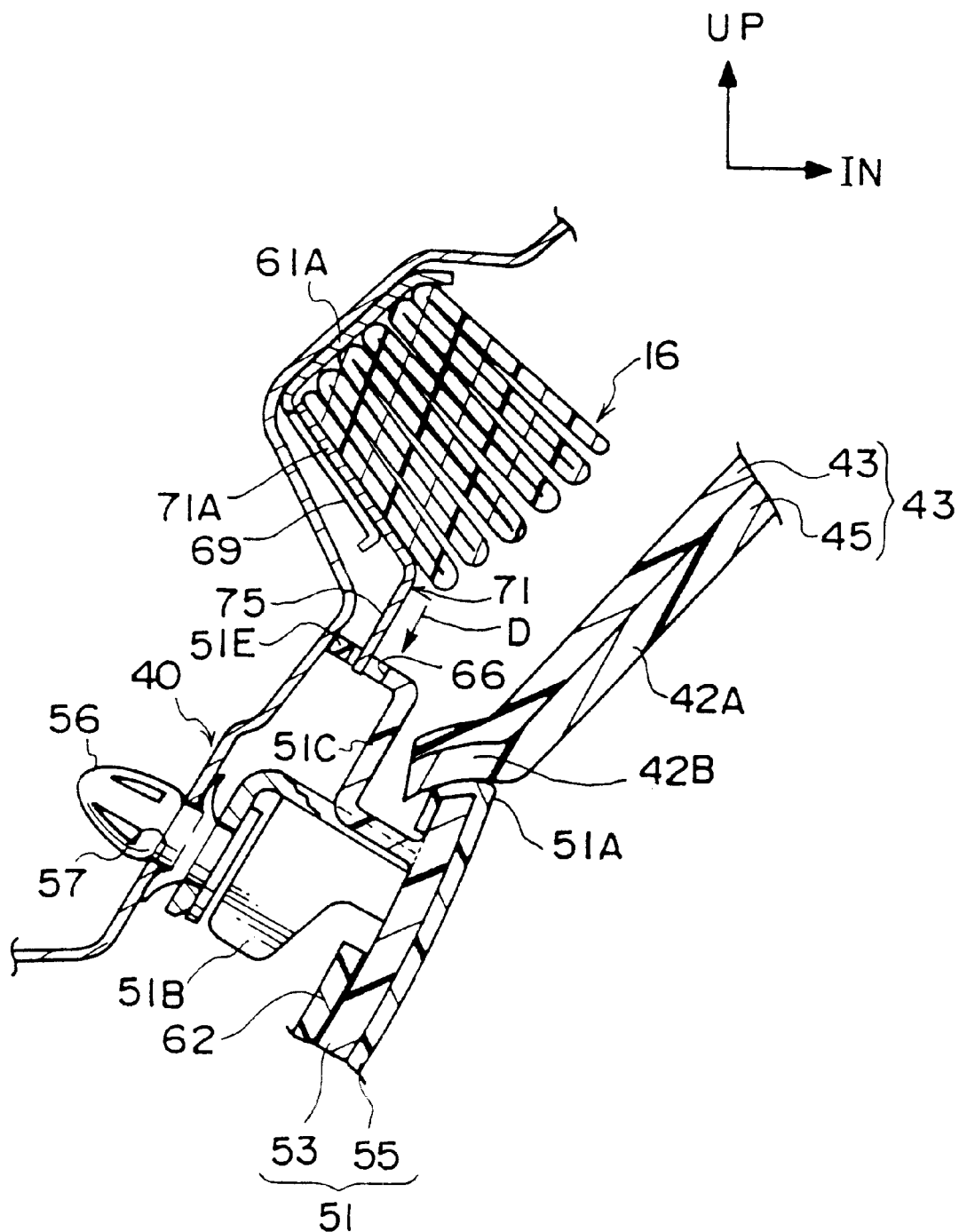
FIG. 25 is a sectional view for explaining an operation of the structure for mounting a head-protecting airbag body according to the ninth embodiment of the present invention.
Figure 26:
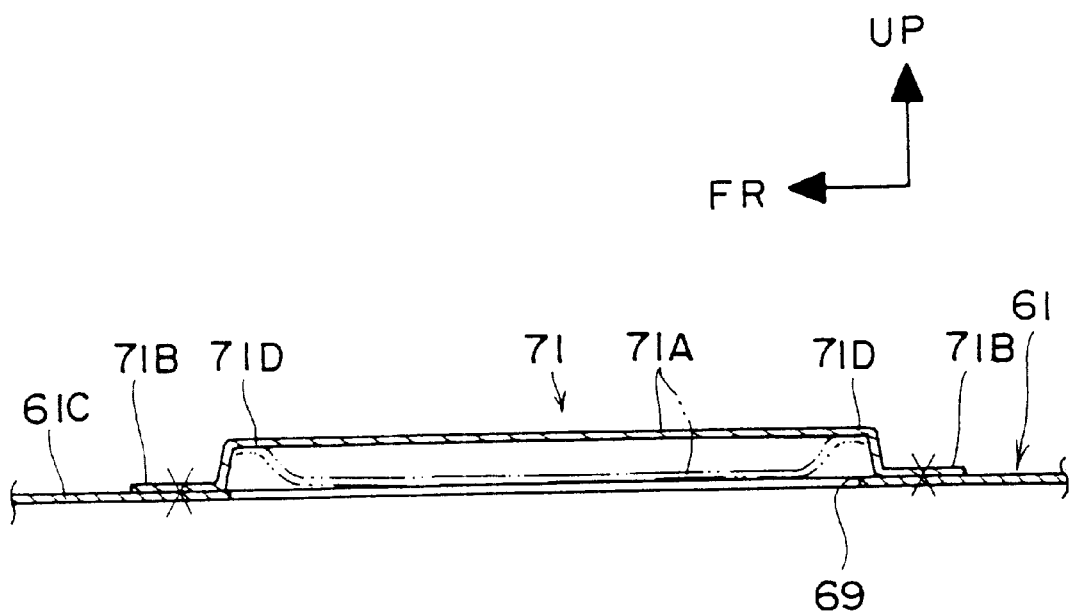
FIG. 26 is an enlarged sectional view taken along line 26—26 of FIG. 24.

Thus, when the airbag body 16 inflates, the brittle portion 71D is bent by inflation force of the airbag body 16 as indicated by double dot and dash line of FIG. 26 so that the guide wall portion 71A of the engaging plate 71 moves generally downward (the direction of arrow D of FIG. 25) relative to the jump base 61.

As shown in FIG. 24, a pair of front and rear plate-shape engaging protrusions 75 are formed at a distal end portion of the guide wall portion 71A of the engaging plate 71 as movement restricting means. Further, the extending portion 51E formed towards a vehicle occupant compartment outer direction is formed at a top end of the flange portion 51C formed on the upper end portion 51A of the B pillar garnish 51 and a pair of the front and rear engaging holes 66 are formed in this extending portion 51E as movement restricting means. Also, when the engaging protrusions 75 move slightly generally downward (the direction of arrow D in FIG. 23), they engage the engaging holes 66. Meanwhile a relationship between the size of the engaging protrusion 75 and the size of the engaging hole 66 is set so as to be capable of securely restricting movement of the upper end portion 51A of the B pillar garnish in a vehicle occupant compartment inner direction and in the diagonally longitudinal directions in a vehicle occupant compartment inner direction.

Next, operation of this embodiment will be described.

According to this embodiment, when the airbag body 16 inflates, the brittle portion 71D of the engaging plate 71 is bent by an inflation pressure of the airbag body 16 as indicated by a double dot and dash line of FIG. 26, so that the engaging protrusions 75 moves generally downward (the direction of arrow D of FIG. 25) relative to the engaging protrusion 75 together with the guide wall portion 71A of the engaging plate 71. As a result, the engaging protrusions 75 of the guide wall portion 71A of the engaging plate 71 engage the engaging holes 66 formed in the extending portion 51E of the B pillar garnish 51, as shown in FIG. 25, thereby restricting movement of the upper end portion 51A of the B pillar garnish in a vehicle occupant compartment inner direction. That is, because, according to this embodiment, the engaging protrusions 75 engage the engaging holes 66 by using inflation force of the airbag body 16, the amount of movement of the upper end portion 51A of the B pillar garnish in a vehicle occupant compartment inner direction can be reduced.

Further, because the amount of movement of the upper end portion 51A of the B pillar garnish in a vehicle occupant compartment inner direction can be reduced as described above, the upper end portion 51A of the B pillar garnish does not have to be firmly fastened to the rail inner panel 40, so that the efficiency of assembling of the B pillar garnish 51 is not damaged.

Figure 27:
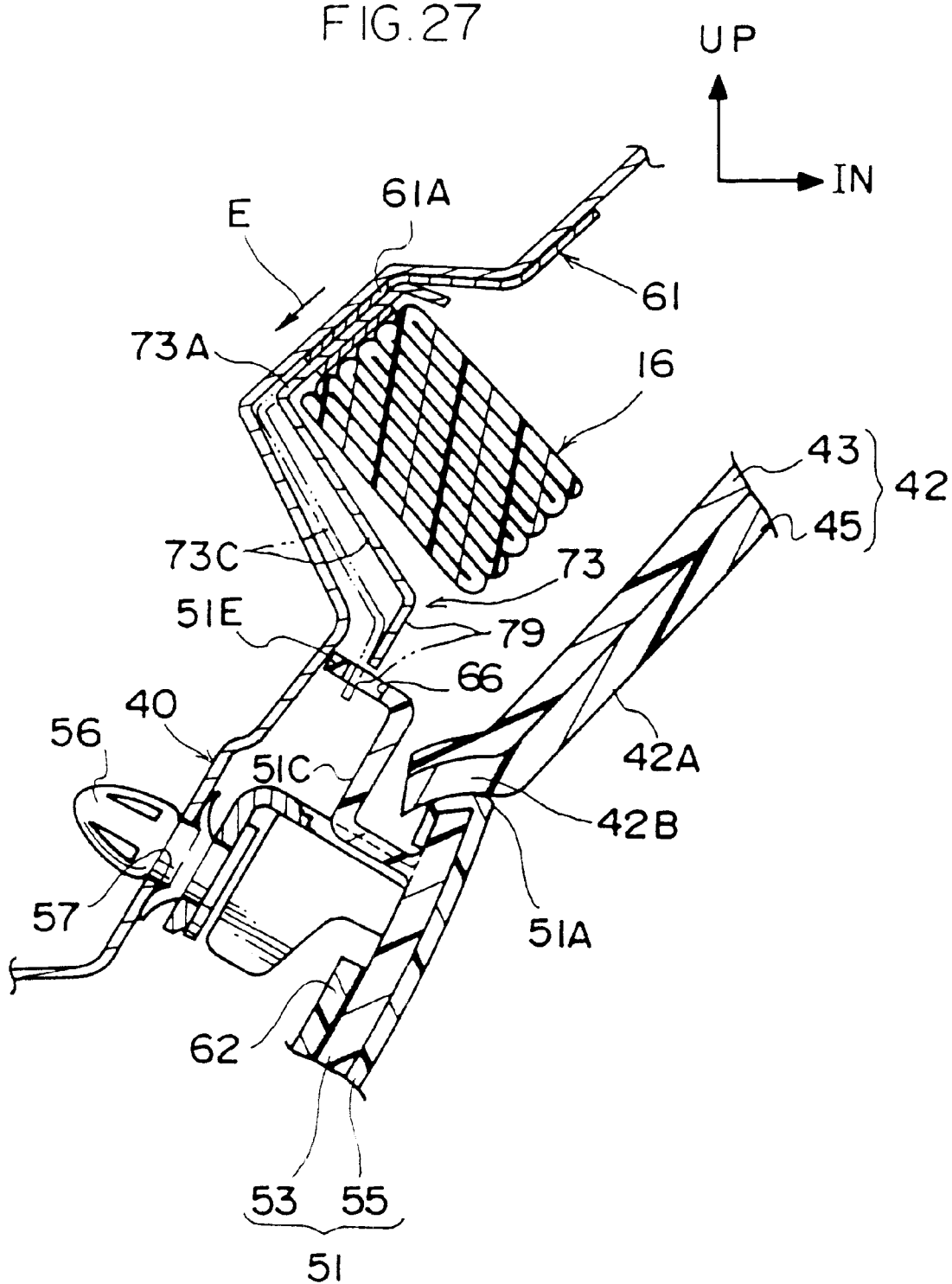
FIG. 27 is a sectional view corresponding to FIG. 1 of a structure for mounting a head-protecting airbag body according to a tenth embodiment of the present invention.

Next, a tenth embodiment of a structure for mounting a head-protecting airbag body of the present invention will be described with reference to FIGS. 27 to 29.

The same reference numerals are attached to the same components as the eighth embodiment and a description thereof is omitted.

Figure 28:
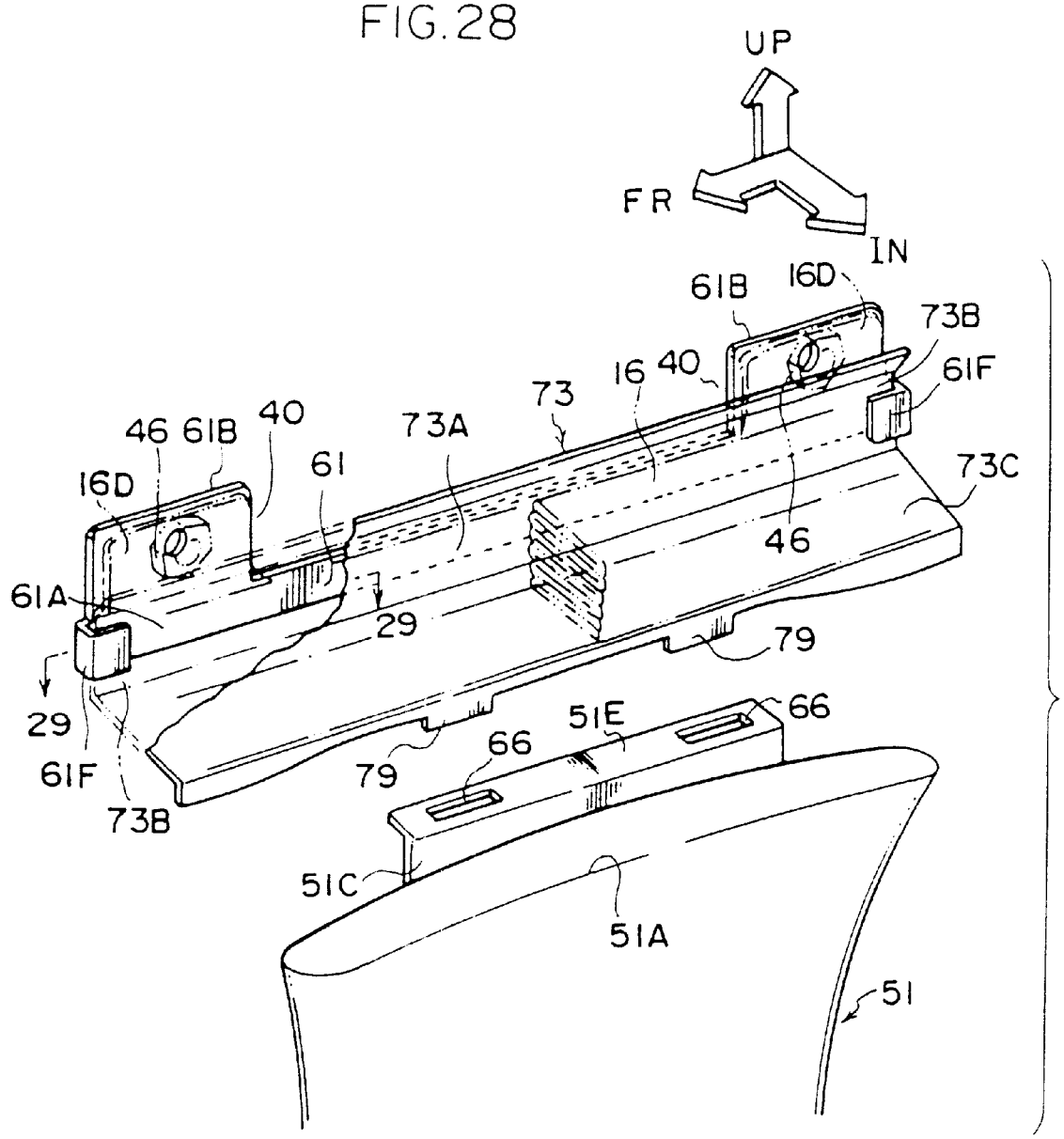
FIG. 28 is a perspective view of a vehicle occupant compartment viewed obliquely from the front showing a upper end portion of a B pillar garnish of a vehicle occupant compartment to which the structure for mounting a head-protecting airbag body according to the tenth embodiment of the present invention is applied.
Figure 29:
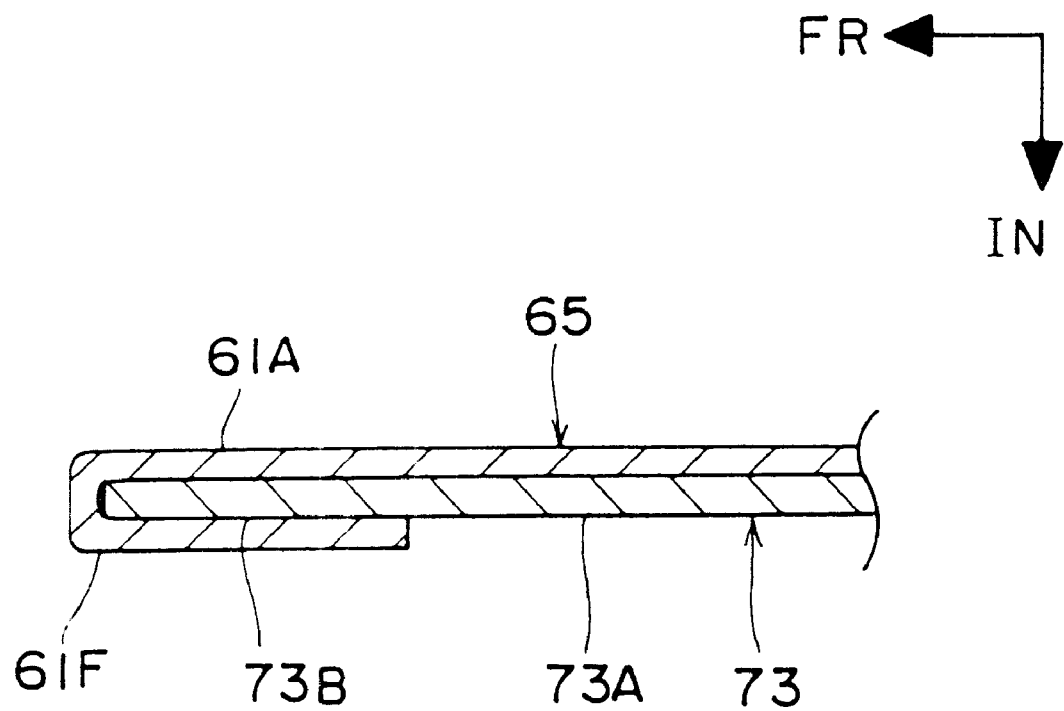
FIG. 29 is an enlarged sectional view taken along line 29—29 of FIG. 28.

As shown in FIG. 28, according to this embodiment, protruding portions 61F are formed on both end portions, in the longitudinal direction, of the vertical wall portion 61A of the jump base 61 as airbag body expansion direction restricting means. An engaging plate 73 constituting the guide wall of the jump base 61 is supported by these protruding portions 61F. That is, as shown in FIG. 29, the protruding portions 61F are hemmed so that the both end portions 73B of the vertical wall portions 73A of the engaging plate 73 are movable by a predetermined amount generally in the up and down direction (the direction opposite to the direction of arrow E of FIG. 27) relative to the vertical wall portion 61A of the jump base 61.

As shown in FIG. 28, a guide wall 73C is formed so as to extend from a bottom end portion of the vertical wall portion 73A of the engaging plate 73 toward the upper end portion 51A of the B pillar garnish 51 and a pair of front and rear plate-shaped engaging protrusions 79 are formed as movement restricting means at a distal end portion of the intermediate portion, in the longitudinal direction, of this guide wall 73C.

Therefore, when the airbag body 16 inflates, the engaging plate 73 is slidable generally downward (the direction of arrow E of FIG. 27) by the hemming processing of the protruding portion 61F of the jump base 61 relative to the vertical wall portion 73A of the engaging plate 73 by an inflation pressure of the airbag body 16.

As shown in FIG. 28, the extending portion 51E extending toward outside of the compartment is formed at a top end of the flange portion 51C formed on the upper end portion 51A of the B pillar garnish 51 and a pair of the front and rear engaging holes 66 are formed in this extending portion 51E as a movement restricting means. Also, when the engaging plate 73 slides slightly downward (the direction of arrow E in FIG. 27), the engaging protrusions 79 of the engaging plate 73 engage the engaging holes 66. Meanwhile, a relationship between the size of the engaging protrusion 79 and the size of the engaging hole 66 is set so as to be capable of securely restricting a movement of the upper end portion 51A of the B pillar garnish in a vehicle occupant compartment inner direction and in the diagonally longitudinal direction in a vehicle occupant compartment inner direction.

Next, operation of this embodiment will be described.

According to this embodiment, when the airbag body 16 inflates, the engaging plate 73 slides substantially downward (direction of an arrow E of FIG. 27) with respect to the vertical wall portion 61A of the jump base 61 by an inflation pressure of the airbag body 16. As a result, as indicated by a double dot and dash line, the guide wall 73C moves downward so that the engaging protrusions 79 of the engaging plate 73 engage the engaging holes 66 formed in the extending portion 51E of the B pillar garnish 51, thereby limiting a movement of the upper end portion 51A of the B pillar garnish in a vehicle occupant compartment inner direction. That is, because according to this embodiment, the engaging protrusions engages the engaging holes 66 by using an inflation force of the airbag body 16, the amount of movement of the upper end portion 51A of the B pillar garnish in a vehicle occupant compartment inner direction can be further reduced.

Further, because the amount of movement of the upper end portion 51A of the B pillar garnish in a vehicle occupant compartment inner direction can be reduced, the upper end portion 51A of the B pillar garnish does not have to be firmly fastened to the rail inner panel 40, so that the efficiency of assembling of the B pillar garnish 51 is never damaged.

Because according to this embodiment, the engaging plate 73 is slidable substantially downward (the direction of arrow E in FIG. 27) with respect to the vertical wall portion 61A of the jump base 61, it is permissible to so construct that the engaging protrusions 73 preliminarily engage the engaging holes of the upper end portion 51A of the B pillar garnish after the upper end portion 51A of the B pillar garnish 51 is assembled to the rail inner panel 40.

Although in the above respective embodiments, the inflator is disposed in the vicinity of a joint portion between the A pillar 20 and the dashboard 22, the present invention can be applied to a rear portion of a vehicle, for example, an airbag apparatus disposed on the C pillar 30. In this case, the jump base 61 is disposed in a region opposing the upper end portion 51A of the B pillar garnish 51, preferably, a region from a position which an assist grip or the like disposed behind the B pillar 18 of the roof side rail 28 overlaps up to the upper end portion 51A of the B pillar garnish 51. Further, the present invention can be applied to a front/rear seat head-protecting airbag apparatus capable of protecting the heads of occupants in the rear seat as well as in the front seat.

Next, an eleventh embodiment of a structure for mounting a head-protecting airbag body of the present invention will be described with reference to FIGS. 30 to 32. In this embodiment, different from the other embodiments, the inflator is disposed on a quarter pillar (C pillar) and this inflator is connected to a rear end of the airbag body 116 through a gas guide pipe or tube (not shown). A sensor is disposed on a center pillar like the other embodiments.

Figure 30:
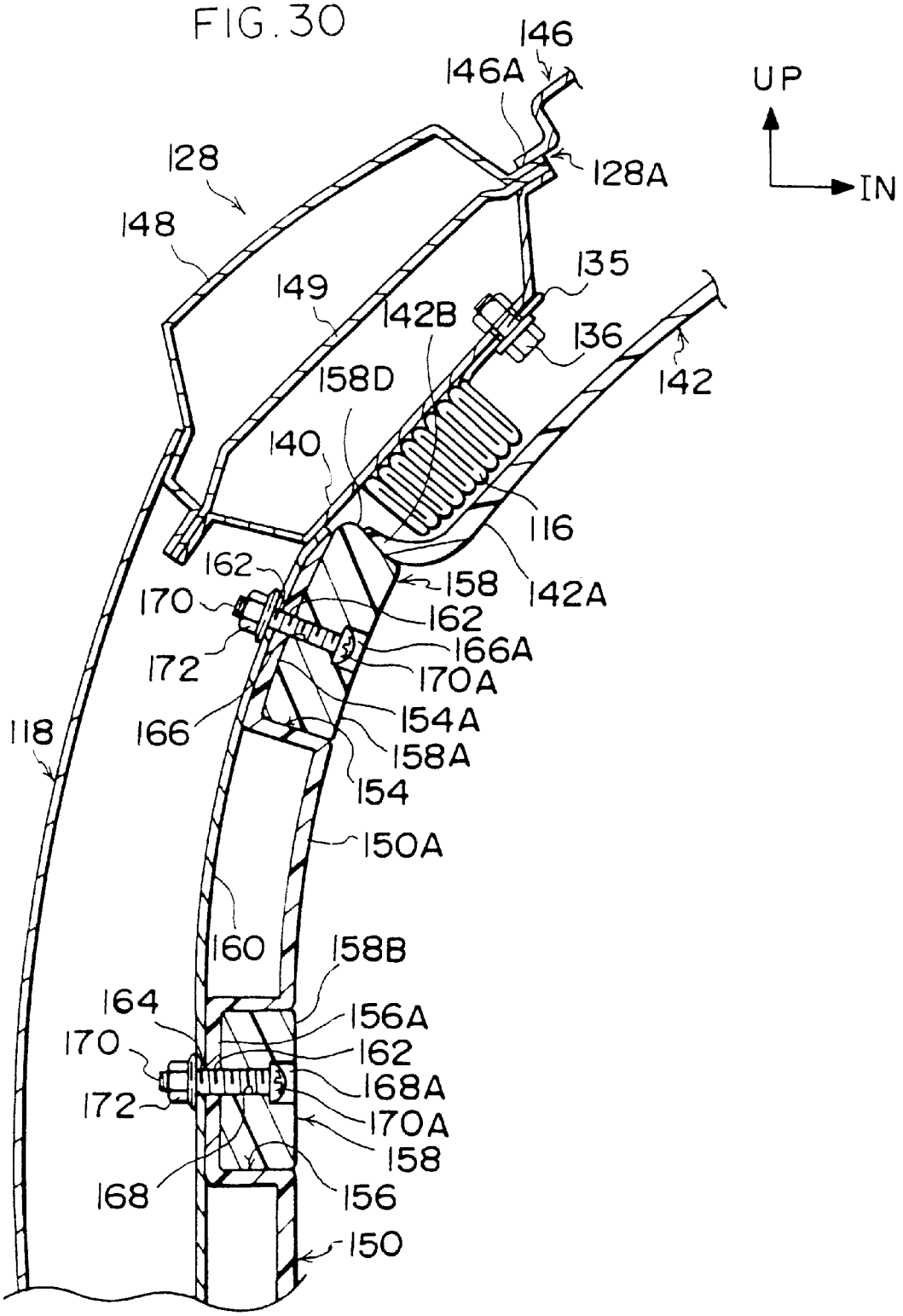
FIG. 30 is an enlarged sectional view taken along line 1—1 of FIG. 31.

As shown in FIG. 30, a roof side rail 128 comprises a rail outer panel 148 having a generally hat-shaped section relatively largely projecting in a vehicle occupant compartment outer direction, a rail inner panel 140 having a generally hat-shaped section relatively largely projecting in a vehicle occupant compartment inner direction and a rail reinforce 149 having a generally hat-shaped section which is placed along the rail outer panel 148 and nipped between the rail outer panel 148 and rail inner panel 140. Both ends of the rail outer panel 148, rail inner panel 140 and rail reinforce 149 are welded together so as to form a closed section. An outside end portion 146A in the vehicle width direction is welded to the upper end portion 128A of the roof side rail 128 composed of the three components.

Mounting portions 135 are formed so as to protrude at predetermined intervals on a top edge of the airbag body 116 and the airbag 116 is fastened to a vehicle body at these mounting portions 135 via fixing members 136 such as bolts. The airbag body 116 is folded generally at the right angle relative to the B pillar garnish 150 disposed inside of the compartment relative to the B pillar 118. The folded airbag body 116 is accommodated between the vehicle transverse direction outer portion 42A and the rail inner panel 140.

Figure 31:
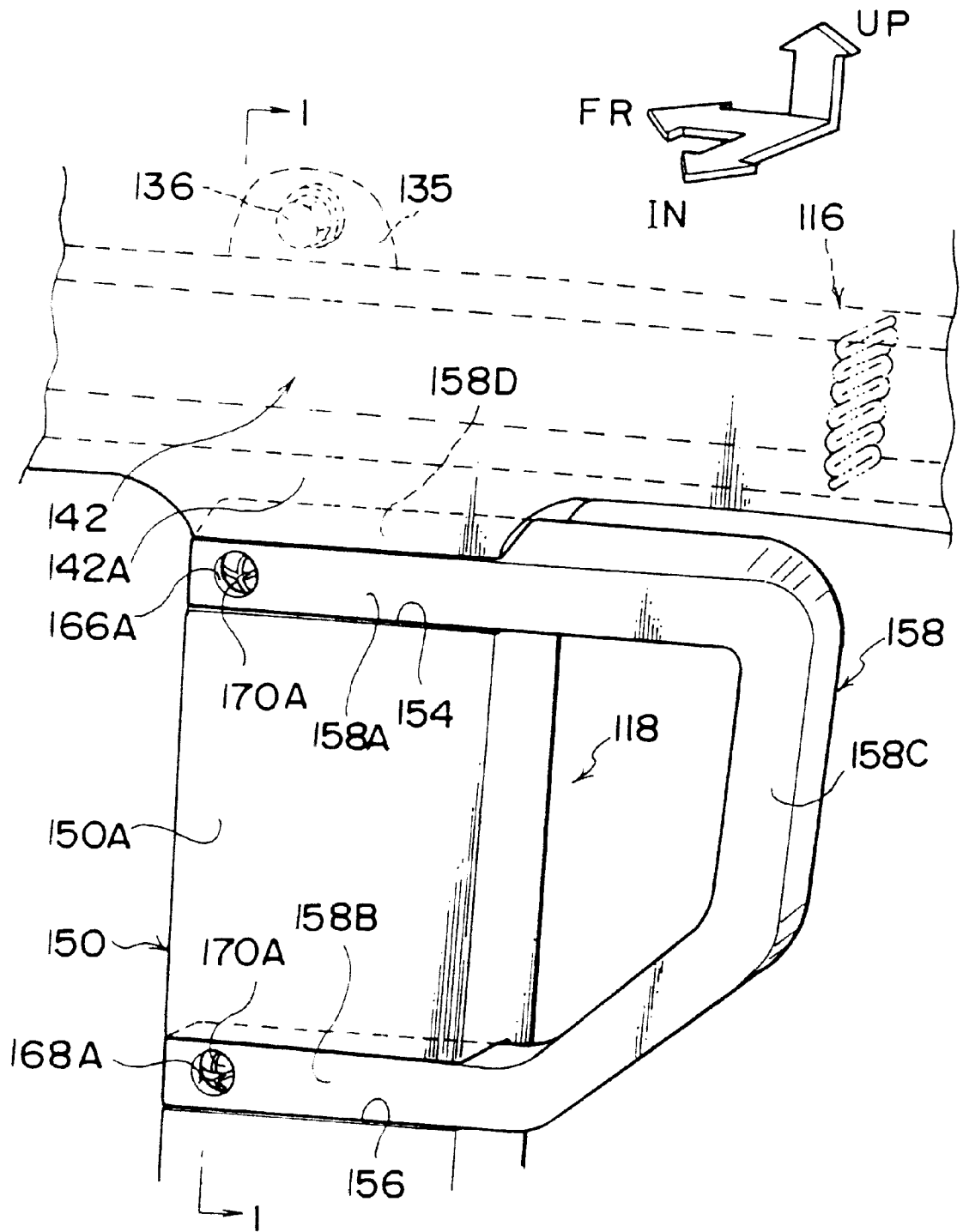
FIG. 31 is a perspective view of a B pillar top portion viewed obliquely from the rear inside of a vehicle to which a structure for mounting a head-protecting airbag body according to an eleventh embodiment of the present invention is applied.

As shown in FIG. 31, a concave portion 154 extending in the longitudinal direction of the vehicle is formed on a upper end portion of the B pillar garnish 150 and a concave portion 156 is formed below this concave portion 154 in parallel to the concave portion 154. Mounting portions 158A, 158B formed on both end portions of a U-shaped assist grip for an occupant are inserted in these concave portions 154, 156. The mounting portions 158A, 158B of the assist grip 158 are substantially flush with a side face inside of the compartment of the B pillar garnish 150 and a grip portion 158C of the assist grip 158 for an occupant projects backward from the B pillar garnish 150.

As shown in FIG. 30, bottom portions 154A, 156A of the concave portions 154, 156 formed in the B pillar garnish 150 are in contact with the B pillar inner panel 160 and through holes 162, 164 are made in those contact portions. Mounting holes 166, 168 are provided in the mounting portions 158A, 158B of the assist grip and then the assist grip 158 and the B pillar garnish 150 are commonly tightened with a bolt 170 as a tightening means which is inserted into each of the mounting holes 166, 168 and a nut 172 which meshes the bolt 170. Large-diameter portions 166A, 168A are formed on the inside portions of the compartment of the mounting holes 166, 168 so that a head portion 170A of the bolt 170 is accommodated in each of the large-diameter portions 166A, 168A.

A terminal portion 142B of a vehicle width direction outside portion 142A is interposed between a top face 158D of the mounting portion 158A above the assist grip 158 and the air bag body 116 and the terminal portion 142B engages the to face 158D of the mounting portion 158A. The top face 158D of the mounting portion 158A is a guide face inclined downward in a vehicle occupant compartment inner direction.

Therefore, when the air bag body 116 inflates, as shown in FIG. 32, the air bag body 116 is guided by the top face 158D of the mounting portion 158A of the assist grip 158 so that it inflates in a vehicle occupant compartment inner direction smoothly.

Next, operation of this embodiment will be described.

According to this embodiment, if a side load larger than a predetermined value is applied to a vehicle side body, a sensor detects that a side collision has occurred. Thus, the inflator is actuated so that a predetermined amount of gas is ejected. As a result, the airbag body 116 begins to inflate, so that the air bag body 116 inflates in the form of a curtain downward from the rear of the vehicle toward the front thereof while pressing out the A pillar garnish and the vehicle transverse direction outer portion 142A of the roof side rail 128 of the roof head lining 142.

At this time, when the expansion of the air bag body 116 reaches a top portion of the B pillar 118, the terminal portion 142B of the vehicle transverse direction outer portion 142A of the roof head lining 142 interposed between the top face 158D of the mounting portion 158A of the assist grip 158 and the air bag body 116 slips out of the top face 158D of the mounting portion 158A, so that the vehicle width direction outside portion 142A of the roof head lining 142 is pressed out in a vehicle occupant compartment inner direction. At this time, the air bag body 116 is expanded smoothly along the top face 158D of the mounting portion 158A in a vehicle occupant compartment inner direction.

Thus, according to this embodiment, the upper end portion of the B pillar garnish 150 is firmly fastened to the B pillar inner panel 160 together with the mounting portion 158A of the assist grip 158 by the assist grip 158 for occupant help. Thus, when the air bag body inflates, the assist grip 158 for the occupant help guides the air bag body 116 in a predetermined direction in a vehicle occupant compartment inner direction. As a result, the airbag body 116 can be prevented from coming into contact with a upper end portion of the B pillar garnish 150, thereby preventing the B pillar garnish 150 from being caught by the upper end portion or slipping out of the B pillar garnish 150. Further, because according to this embodiment, the assist grip 150 which is an existing interior component is used, there never occurs an increase of the quantity of necessary parts.

Although the present invention has been described in detail about specific embodiments, the present invention is not limited to those embodiments, but it is apparent to those skilled in the art that other various modifications can be achieved within the scope of the invention. For example, according to the eleventh embodiment, the airbag body 116 inflates successively from the rear of the vehicle toward the front thereof by gas ejected from the inflator disposed on the C pillar, it is permissible that as shown in FIG. 33, the front end positions of the mounting portions 158A, 158B of the assist grip 158 for occupant help are up to the middle portion in the longitudinal direction of the B pillar garnish 150 and the concave portions 154, 156 of the B pillar garnish 150 are up to the middle portion in the longitudinal direction of the B pillar garnish 150.

Further although in the above-described respective embodiments, the folded airbag body 16 is held in folding state by means of the tape 52 (see FIG. 3), it is permissible to hold the airbag body in the folded state by means of a lapping material, a belt, a case or the like instead of the tape 52.

What is claimed is:

1. A mounting structure for use with a head-protecting airbag body in a vehicle having a roof side rail and a B pillar, wherein the airbag body is inflatable at least along the roof side rail and across the B pillar, the mounting structure comprising:

a B pillar garnish mountable to the B pillar for covering the B pillar, the B pillar garnish having an upper end portion; and catch preventing means for, even when a position of the upper end portion of the B pillar garnish moves inwardly relative to the vehicle during a side collision of the vehicle, preventing the airbag body from being caught on the upper end portion of the B pillar garnish.

2. A mounting structure according to claim 1, wherein the catch preventing means comprises airbag body expansion direction restricting means mountable on the roof side rail in a vicinity of the upper end portion of the B pillar garnish and having a guide wall extending toward the upper end portion of the B pillar garnish; and movement restricting means disposed on the upper end portion of the B pillar garnish and the airbag body expansion direction restricting means and by engaging each other upon a side collision, restricting movement of the upper end portion of the B pillar garnish in a transverse inner direction relative to the vehicle.

3. A mounting structure according to claim 2, wherein the movement restricting means comprises an engaging protrusion formed so as to protrude on one of the upper end portion of the B pillar garnish and the airbag body expansion direction restricting means and an engaging hole formed on the other thereof.

4. A mounting structure according to claim 1, wherein the vehicle includes a vehicle occupant compartment and the catch preventing means further comprises an airbag body link means for moving the airbag body in an inner direction relative to the vehicle occupant compartment, in linkage with a movement of the upper end portion of the B pillar garnish upon a side collision.

5. A mounting structure according to claim 4, wherein the airbag body link means is a plate disposed at the upper end portion of the B pillar garnish and comprising a guide wall for guiding the airbag body in the vehicle occupant compartment inner direction and an extending portion for scrawling over the airbag body from an outer side of the vehicle occupant compartment.

6. A mounting structure according to claim 1, wherein the vehicle includes a vehicle occupant compartment and the catch preventing means comprises airbag body expansion direction restricting means mountable on the roof side rail in a vicinity of the upper end portion of the B pillar garnish and having a guide wall extending toward the upper end portion of the B pillar garnish and guide wall link means for moving the guide wall of the airbag body expansion direction restricting means in an inner direction relative to the vehicle occupant compartment, in linkage with movement of the upper end portion of the B pillar garnish in the vehicle occupant compartment inner direction upon a side collision.

7. A mounting structure according to claim 6, wherein the airbag body expansion direction restricting means is mount able to the roof side rail so as to be deformable in the vehicle occupant compartment inner direction.

8. A mounting structure according to claim 6, wherein the guide wall of the airbag body expansion direction restricting means is deformable in the vehicle occupant compartment inner direction.

9. A mounting structure according to claim 2, wherein the movement restricting means comprises an engaging protrusion formed on one of the B pillar garnish upper end portion and the airbag body expansion direction restricting means and an engaging hole formed on the other, which the engaging protrusions engages, and the engaging protrusion has a tapered face so that the width of a distal end thereof is smaller than the width of a proximal portion thereof, the engaging protrusion being caught by the engaging hole via the tapered face.

10. A mounting structure according to claim 6, wherein the guide wall link means comprises an engaging protrusion formed on one of the B pillar garnish upper end portion and the airbag body expansion direction restricting means and an engaging hole formed on the other, which the engaging protrusions engages, and the engaging protrusion has a tapered face so that the width of a distal end thereof is smaller than the width of a proximal portion thereof, the engaging protrusion being caught by the engaging hole via the tapered face.

11. A mounting structure according to claim 2, wherein the movement restricting means comprises an engaging protrusion formed on one of the B pillar garnish upper end portion and the airbag body expansion direction restricting means and an engaging hole formed on the other, which the engaging protrusion engages, and the engaging protrusion has a tapered face so that the width of a front end thereof is smaller than the width of a root thereof, the engaging protrusion being formed in such shape that an engaging groove is formed at a proximal portion thereof.

12. A mounting structure according to claim 6, wherein the guide wall link means comprises an engaging protrusion formed on one of the B pillar garnish upper end portion and the airbag body expansion direction restricting means and an engaging hole formed on the other, which the engaging protrusion engages, and the engaging protrusion has a tapered face so that the width of a front end thereof is smaller than the width of a root thereof, the engaging protrusion being formed in such a shape that an engaging groove is formed at a proximal portion thereof.

13. A mounting structure according to claim 2, wherein the movement restricting means comprises an engaging protrusion formed so as to protrude on the airbag body expansion direction restricting means and an engaging hole formed on the B pillar garnish upper end portion and a brittle portion is formed on the airbag body expansion direction restricting means, so that when the airbag body inflates, the guide wall of the airbag body expansion direction restricting means is deformed downward with the brittle portion as a beginning point, thereby engaging the engaging protrusion in the engaging hole.

14. A mounting structure according to claim 2, wherein the movement restricting means comprises an engaging plate having an engaging protrusion movable downward relative to the airbag body expansion direction restricting means and an engaging hole formed on the B pillar garnish upper end portion, and the engaging plate is moved downward by an inflation force of the airbag body, thereby engaging the engaging protrusion in the engaging hole.

15. A mounting structure according to claim 2, wherein the movement restricting means comprises an engaging protrusion formed so as to protrude on the airbag body expansion direction restricting means and an engaging hole formed on the B pillar garnish upper end portion, and the guide wall of the airbag body expansion direction restricting means is slidable by a predetermined amount in a vertical direction.

16. A mounting structure according to claim 1, wherein the B pillar includes an inner panel, and the vehicle includes a compartment for vehicle occupants, the catch preventing means comprising a concave bottom portion formed on the upper end portion of the B pillar garnish and coming into contact with the inner panel of the B pillar; an assist grip for a vehicle occupant in which a mounting portion of the assist group inserted in the concave portion is fasten able to the inner panel of the B pillar by tightening means; and a terminal portion of a vehicle transverse direction outer portion.

17. A mounting structure according to claim 16, wherein the assist grip includes a top face opposing the airbag body, the top face being a guide surface inclined downwardly inward of relative to the vehicle occupant compartment.

18. A mounting structure according to claim 2, wherein the airbag body expansion direction restricting means is formed by an elongated plate member having a generally L-shaped section.

19. A mounting structure according to claim 2, wherein the airbag body expansion direction restricting means is disposed in a region opposed to the upper end portion of the B pillar garnish.

20. A mounting structure according to claim 8, wherein the guide portion has a bellows portion, and the bellows portion is stretched so that the guide wall is deformed.

21. A mounting structure according to claim 7, wherein the airbag body expansion direction restricting means is mount able at two points spaced from each other in the vehicle longitudinal direction on the roof side rail, the two points being movable towards each other so that the airbag body expansion direction restricting means is bent in the vehicle occupant compartment inner direction.

22. A mounting structure according to claim 13, wherein the brittle portion includes a cutaway portion formed on the guide wall.

23. A mounting structure for use with a head-protecting airbag body in a vehicle, the vehicle including a vehicle occupant compartment, a roof side rail and a B pillar, wherein the airbag body is inflatable at least along the roof side rail and across the B pillar, the mounting structure comprising:
 a B pillar garnish mountable to the B pillar for covering the B pillar, the B pillar, garnish having an upper end portion;
 airbag body expansion direction restricting means mountable on the roof side rail close to the, upper end portion of the B pillar garnish when the B pillar garnish is mounted to the B pillar, a longitudinal direction of the airbag body expansion direction restricting means extending generally perpendicularly to the B pillar, and having a guide wall extending to the upper end portion of the B pillar garnish and a vertical wall generally perpendicular to the guide wall; and
 movement restricting means disposed on the upper end portion of the B pillar garnish and the airbag body expansion direction restricting means, which is placed in an engagement state in a vehicle side collision to restrict movement of the upper end portion of the B pillar garnish in an inner direction relative to the vehicle occupant compartment.

24. A mounting structure according to claim 23, wherein the upper end portion of the B pillar garnish includes a different member fixed to the B pillar garnish, the movement restricting means including an engaging protrusion projecting from one of the different member and the airbag body expansion direction restricting means, and an engaging hole formed on the other, and the different member comprises a metal.

25. A mounting structure for use with a head-protecting airbag body in a vehicle, the vehicle including a vehicle occupant compartment, a roof side rail and a B pillar, wherein the airbag body is inflatable at least along the roof side rail and across the B pillar, the mounting structure comprising:
 a B pillar garnish mountable to the B pillar for covering the B pillar, the B pillar garnish having an upper end portion;
 airbag body expansion direction restricting means on the roof side rail close to the upper end portion of B pillar garnish when the B pillar garnish is mounted to the B pillar, a longitudinal direction of the airbag body expansion direction restricting means extending generally perpendicularly to the B pillar, and having a guide wall extending to the upper end portion of the B pillar garnish and a vertical wall generally perpendicular to the guide wall; and guide wall link means for moving the guide wall of the airbag body expansion direction restricting means in an inner direction relative to the vehicle occupant compartment in linkage with movement of the upper end portion of the B pillar garnish in the vehicle occupant compartment inner direction upon a side collision.

26. A mounting structure according to claim 25, wherein the upper end portion of the B pillar garnish includes a different member fixed to the B pillar garnish, a movement restricting means including an engaging protrusion projecting from one of the different member and the airbag body expansion direction restricting means, and an engaging hole formed on the other, and the different member comprising a metal.

27. A mounting structure according to claim 25, wherein the guide wall has a bellows portion, and the bellows portion is stretched so that the guide wall is deformed in the vehicle occupant compartment inner direction.

28. A mounting structure according to claim 1, wherein the catch preventing means includes an airbag body link means having a region which substantially encompasses a vehicle outer side surface of the airbag body, and said airbag body link means moves the airbag body toward a vehicle interior in linkage with movement of an upper end portion of a B pillar garnish toward the vehicle interior at a time of a side collision.

* * * * *